United States Patent
Yerramalli et al.

(10) Patent No.: US 10,638,444 B2
(45) Date of Patent: Apr. 28, 2020

(54) POSITIONING TECHNIQUES FOR WIRELESS COMMUNICATIONS DEVICES USING SHARED RADIO FREQUENCY SPECTRUM

(71) Applicant: QUALCOMM Incorporated, San Diego, CA (US)

(72) Inventors: Srinivas Yerramalli, San Diego, CA (US); Hao Xu, Beijing (CN); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/826,439

(22) Filed: Nov. 29, 2017

(65) Prior Publication Data

US 2018/0160389 A1 Jun. 7, 2018

Related U.S. Application Data

(60) Provisional application No. 62/429,051, filed on Dec. 1, 2016.

(51) Int. Cl.
*H04W 4/02* (2018.01)
*H04W 64/00* (2009.01)
(Continued)

(52) U.S. Cl.
CPC .......... *H04W 64/00* (2013.01); *H04W 16/14* (2013.01); *H04W 24/10* (2013.01);
(Continued)

(58) Field of Classification Search
CPC ................................ H04W 64/00; H04W 4/02
See application file for complete search history.

(56) References Cited

U.S. PATENT DOCUMENTS

| | | | |
|---|---|---|---|
| 2011/0124347 A1* | 5/2011 | Chen | H04W 64/00 455/456.1 |
| 2013/0188510 A1* | 7/2013 | Siomina | H04W 24/10 370/252 |

(Continued)

OTHER PUBLICATIONS

3GPP Study on Indoor Positioning Enhancements for UTRA and LTE, 3GPP TR37.857, Dec. 2015.*

(Continued)

*Primary Examiner* — Myron Wyche
(74) *Attorney, Agent, or Firm* — Holland & Hart LLP

(57) ABSTRACT

Positioning techniques for wireless communications devices using shared radio frequency spectrum are provided that may enhance positioning determination for devices operating using shared radio frequency spectrum. Various disclosed techniques provide for identifying determining one or more parameters for a positioning procedure for a UE based on characteristics of shared radio frequency spectrum transmissions. Such parameters may include, for example, frequency information for positioning transmissions or frequency hopping patterns. In some cases, a base station may transmit multiple positioning transmissions that have different coverage levels. In some cases, a UE may transmit an uplink positioning signal that may be received by multiple base stations and used for UE position determination. In some cases, a UE may be configured to monitor for a positioning transmissions on a dedicated frequency, and report measurements associated with the positioning transmissions using a shared frequency.

30 Claims, 21 Drawing Sheets

(51) Int. Cl.
*H04W 74/08* (2009.01)
*H04W 24/10* (2009.01)
*H04W 16/14* (2009.01)
*H04W 88/08* (2009.01)
*H04W 88/02* (2009.01)

(52) U.S. Cl.
CPC ........ *H04W 74/0808* (2013.01); *H04W 88/02* (2013.01); *H04W 88/08* (2013.01)

(56) References Cited

U.S. PATENT DOCUMENTS

| | | | | |
|---|---|---|---|---|
| 2013/0194931 | A1* | 8/2013 | Lee | H04L 5/0053 370/241 |
| 2013/0294402 | A1* | 11/2013 | Yoon | H04W 64/00 370/330 |
| 2014/0254412 | A1* | 9/2014 | Siomina | H04W 64/00 370/252 |
| 2016/0028533 | A1* | 1/2016 | Kazmi | H04W 72/1278 370/296 |
| 2016/0050534 | A1* | 2/2016 | Lim | G01S 5/0236 370/252 |
| 2016/0205651 | A1* | 7/2016 | Isa | H04W 4/70 455/456.1 |
| 2017/0366308 | A1* | 12/2017 | Choi | H04L 1/1887 |

OTHER PUBLICATIONS

3GPP: "3rd Generation Partnership Project; Technical Specification Group Radio Access Network; Study on indoor positioning enhancements for UTRA and LTE (Release 13)", 3GPP Draft; DRAFT37857-D10, 3rd Generation Partnership Project (3GPP), Mobile Competence Centre ; 650, Route Des Lucioles ; F-06921 Sophia-Antipolis Cedex; France, Dec. 15, 2015 (Dec. 15, 2015), pp. 1-82, XP051063636, Retrieved from the Internet: URL: http://www.3gpp.org/ftp/tsg_ran/WG1_RL1/DRAFT/ [retrieved on Dec. 15, 2015].

Ericsson: "PRS Configurations for FeMTC", 3GPP Draft; R1-1611103, 3rd Generation Partnership Project (3GPP), Mobile Competence Centre; 650, Route Des Lucioles; F-06921 Sophia-Anti Polls Cedex; France, vol. RAN WG1, No. Reno, Nevada, USA; Nov. 13, 2016, XP051175085, Retrieved from the Internet: URL:http://www.3gpp.org/ftp/Meetings_3GPP_SYNC/RAN1/Docs/ [retrieved on Nov. 13, 2016], 5 pages.

Ericsson: "PRS Frequency Location Determination for FeMTC", 3GPP Draft; R1-1611104, 3rd Generation Partnership Project (3GPP), Mobile Competence Centre; 650, Route Des Lucioles; F-06921 Sophia-Anti Polls Cedex; France, vol. RAN WG1, No. Reno, Nevada, USA; Nov. 13, 2016, XP051175086, Retrieved from the Internet: URL:http://www.3gpp.org/ftp/Meetings_3GPP_SYNC/RAN1/Docs/ [retrieved on Nov. 13, 2016], 5 pages.

International Search Report and Written Opinion—PCT/US2017/064018—ISA/EPO—dated Feb. 15, 2018 (170865WO).

Nokia et al., "UTDOA Positioning in NB-IoT", 3GPP Draft; R1-1611305, 3rd Generation Partnership Project (3GPP), Mobile Competence Centre; 650, Route Des Lucioles; F-06921 Sophia-Anti Polls Cedex; France, vol. RAN WG1, No. Reno, Nevada, USA; Nov. 13, 2016, XP051175286, Retrieved from the Internet: URL:http://www.3gpp.org/ftp/Meetings_3GPP_SYNC/RAN1/Docs/ [retrieved on Nov. 13, 2016], 4 pages.

ZTE: "UTDOA Support for NB-IoT", 3GPP Draft; R1-167322, 3rd Generation Partnership Project (3GPP), Mobile Competence Centre; 650, Route Des Lucioles; F-06921 Sophia-Anti Polls Cedex; France, vol. RAN WG1, No. Gothenburg, Sweden; Aug. 13, 2016, XP051133021, Retrieved from the Internet: URL:http://www.3gpp.org/ftp/tsg_ran/WG1_RL1/TSGR1_86/Docs/ [retrieved on Aug. 13, 2016], 9 pages.

* cited by examiner

POSITIONING TECHNIQUES FOR WIRELESS COMMUNICATIONS DEVICES USING SHARED RADIO FREQUENCY SPECTRUM

CROSS REFERENCES

The present application for patent claims priority to U.S. Provisional Patent Application No. 62/429,051 by Yerramalli, et al., entitled "Positioning Techniques For Wireless Communications Devices Using Shared Radio Frequency Spectrum," filed Dec. 1, 2016, assigned to the assignee hereof, and is hereby incorporated by reference herein in its entirety.

BACKGROUND

The following relates generally to wireless communication, and more specifically to positioning techniques for wireless communications devices using shared radio frequency spectrum.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

A wireless multiple-access communication system may include a number of network access devices, each simultaneously supporting communication for multiple communication devices, otherwise known as user equipment (UEs). In a Long-Term Evolution (LTE) or LTE-Advanced (LTE-A) network, a network access device may take the form of a base station, with a set of one or more base stations defining an eNodeB (eNB). In a next generation, 5G, or new radio (NR) network, a network access device may take the form of a smart radio head (RH) or access node controller (ANC), with a set of smart radio heads in communication with an ANC defining a gNodeB (gNB). In a wireless local area network (WLAN), a network access device may take the form of a WLAN access point. A network access device may communicate with a UE on downlink channels (e.g., for transmissions from the network access device to the UE) and uplink channels (e.g., for transmissions from the UE to the network access device).

SUMMARY

The described techniques relate to improved methods, systems, devices, or apparatuses that support positioning techniques for wireless communications devices using shared radio frequency spectrum. Generally, the described techniques provide for identifying characteristics of communications in a shared radio frequency spectrum and determining one or more parameters for a positioning procedure for a UE based in the identified characteristics.

In some cases, the one or more parameters may include frequency information for positioning reference signals, frequency hopping patterns for one or more base stations, a frame structure used by one or more base stations, a maximum number of frames of subframes to monitor for a positioning transmission, a maximum number of times to attempt positioning transmission reception for a base station, or any combination thereof. In some cases, a base station may transmit multiple positioning transmissions that have different coverage levels. In some cases, a UE may be configured to transmit an uplink positioning signal that may be received by multiple base stations and used for UE position determination. In other cases, a UE may be configured to monitor for a positioning reference signal (PRS) from multiple base stations on a dedicated radio frequency spectrum, and report measurements associated with the monitored PRSs using a shared radio frequency spectrum.

A method of wireless communication is described. The method may include identifying a UE that is using frequency hopping in a shared radio frequency spectrum band for wireless communications, determining, based at least in part on the frequency hopping, one or more parameters for performing a positioning procedure to determine a position of the UE, and transmitting the one or more parameters to the UE.

An apparatus for wireless communication is described. The apparatus may include means for identifying a UE that is using frequency hopping in a shared radio frequency spectrum band for wireless communications, means for determining, based at least in part on the frequency hopping, one or more parameters for performing a positioning procedure to determine a position of the UE, and means for transmitting the one or more parameters to the UE.

Another apparatus for wireless communication is described. The apparatus may include a processor, memory in electronic communication with the processor, and instructions stored in the memory. The instructions may be operable to cause the processor to identify a UE that is using frequency hopping in a shared radio frequency spectrum band for wireless communications, determine, based at least in part on the frequency hopping, one or more parameters for performing a positioning procedure to determine a position of the UE, and transmit the one or more parameters to the UE.

A non-transitory computer readable medium for wireless communication is described. The non-transitory computer-readable medium may include instructions operable to cause a processor to identify a UE that is using frequency hopping in a shared radio frequency spectrum band for wireless communications, determine, based at least in part on the frequency hopping, one or more parameters for performing a positioning procedure to determine a position of the UE, and transmit the one or more parameters to the UE.

Some examples of the method, apparatus, and non-transitory computer-readable medium described above may further include processes, features, means, or instructions for identifying a PRS frequency hopping pattern for a serving base station and one or more neighboring base stations. Some examples of the method, apparatus, and non-transitory computer-readable medium described above may further include processes, features, means, or instructions for determining a first parameter of the one or more parameters based at least in part on the PRS frequency hopping pattern for the serving base station and one or more neighboring base stations.

In some examples of the method, apparatus, and non-transitory computer-readable medium described above, the one or more parameters include information for the UE to perform transmission detection for a serving base station and one or more neighboring base stations.

Some examples of the method, apparatus, and non-transitory computer-readable medium described above may further include processes, features, means, or instructions for identifying a frequency for one or more uplink positioning transmissions of the UE for each of a serving base station and one or more neighboring base stations. Some examples of the method, apparatus, and non-transitory computer-readable medium described above may further include processes, features, means, or instructions for determining a first parameter of the one or more parameters based at least in part on the identified frequencies.

Some examples of the method, apparatus, and non-transitory computer-readable medium described above may further include processes, features, means, or instructions for configuring the UE to transmit the one or more uplink positioning transmissions without performing a listen-before-talk (LBT) procedure.

Some examples of the method, apparatus, and non-transitory computer-readable medium described above may further include processes, features, means, or instructions for determining a transmission time for each uplink positioning transmission based at least in part on an estimated range between the UE and each of the serving base station and the one or more neighboring base stations. Some examples of the method, apparatus, and non-transitory computer-readable medium described above may further include processes, features, means, or instructions for determining a second parameter of the one or more parameters based at least in part on the determined transmission times for each uplink positioning transmission.

Some examples of the method, apparatus, and non-transitory computer-readable medium described above may further include processes, features, means, or instructions for determining one or more frequencies in a dedicated radio frequency spectrum band for PRS transmissions of one or more base stations. Some examples of the method, apparatus, and non-transitory computer-readable medium described above may further include processes, features, means, or instructions for configuring the UE to monitor the one or more frequencies in the dedicated radio frequency spectrum band for the PRS transmissions and transmit measurements associated with the PRS transmissions using the shared radio frequency spectrum band.

Some examples of the method, apparatus, and non-transitory computer-readable medium described above may further include processes, features, means, or instructions for determining a fixed or floating frame alignment for a serving base station and one or more neighboring base stations. Some examples of the method, apparatus, and non-transitory computer-readable medium described above may further include processes, features, means, or instructions for determining a first parameter of the one or more parameters based at least in part on the fixed or floating frame alignment for one or more of the serving base station or the one or more neighboring base stations.

In some examples of the method, apparatus, and non-transitory computer-readable medium described above, the one or more parameters include one or more of a number of frames or subframes that the UE may be to monitor for a positioning reference signal.

In some examples of the method, apparatus, and non-transitory computer-readable medium described above, the one or more parameters include a maximum number of attempts that the UE may be to perform to identify a positioning reference signal from one or more neighboring base stations.

Some examples of the method, apparatus, and non-transitory computer-readable medium described above may further include processes, features, means, or instructions for receiving, from the UE, one or more measurement reports generated from the positioning procedure. Some examples of the method, apparatus, and non-transitory computer-readable medium described above may further include processes, features, means, or instructions for determining a position of the UE based at least in part on the one or more measurement reports.

In some examples of the method, apparatus, and non-transitory computer-readable medium described above, the one or more measurement reports include observed time-difference of arrival (OTDOA) measurements associated with one or more PRSs from one or more of a serving base station and one or more neighboring base stations.

Some examples of the method, apparatus, and non-transitory computer-readable medium described above may further include processes, features, means, or instructions for transmitting a first PRS transmission and a second PRS transmission to the UE, wherein the first PRS transmission provides increased coverage relative to the second PRS transmission.

A method of wireless communication is described. The method may include receiving, at a UE, one or more parameters for performing a positioning procedure to determine a position of the UE while operating using frequency hopping in a shared radio frequency spectrum band and performing the positioning procedure, based at least in part on the one or more parameters.

An apparatus for wireless communication is described. The apparatus may include means for receiving, at a UE, one or more parameters for performing a positioning procedure to determine a position of the UE while operating using frequency hopping in a shared radio frequency spectrum band and means for performing the positioning procedure, based at least in part on the one or more parameters.

Another apparatus for wireless communication is described. The apparatus may include a processor, memory in electronic communication with the processor, and instructions stored in the memory. The instructions may be operable to cause the processor to receive, at a UE, one or more parameters for performing a positioning procedure to determine a position of the UE while operating using frequency hopping in a shared radio frequency spectrum band and perform the positioning procedure, based at least in part on the one or more parameters.

A non-transitory computer readable medium for wireless communication is described. The non-transitory computer-readable medium may include instructions operable to cause a processor to receive, at a UE, one or more parameters for performing a positioning procedure to determine a position of the UE while operating using frequency hopping in a shared radio frequency spectrum band and perform the positioning procedure, based at least in part on the one or more parameters.

Some examples of the method, apparatus, and non-transitory computer-readable medium described above may further include processes, features, means, or instructions for identifying, based at least in part on the one or more parameters, a PRS frequency hopping pattern for a serving base station and one or more neighboring base stations. Some examples of the method, apparatus, and non-transitory computer-readable medium described above may further include processes, features, means, or instructions for monitoring for a PRS transmission from one or more of the serving base station or the one or more neighboring base stations based at least in part on the PRS frequency hopping pattern. Some examples of the method, apparatus, and non-transitory computer-readable medium described above may further include processes, features, means, or instructions for determining an OTDOA based at least in part on one or more identified PRS transmissions.

In some examples of the method, apparatus, and non-transitory computer-readable medium described above, the one or more parameters include information for detecting transmissions of a serving base station and one or more neighboring base stations.

Some examples of the method, apparatus, and non-transitory computer-readable medium described above may further include processes, features, means, or instructions for identifying, based at least in part on the one or more parameters, a frequency for one or more uplink positioning transmissions to be transmitted from the UE to each of a serving base station and one or more neighboring base stations. Some examples of the method, apparatus, and non-transitory computer-readable medium described above may further include processes, features, means, or instructions for transmitting the one or more uplink positioning transmissions to one or more of the serving base station or the one or more neighboring base stations using the identified frequencies.

In some examples of the method, apparatus, and non-transitory computer-readable medium described above, the transmitting the one or more uplink positioning transmissions may be performed in an absence of performance of a LBT procedure.

Some examples of the method, apparatus, and non-transitory computer-readable medium described above may further include processes, features, means, or instructions for determining, based at least in part on the one or more parameters, a transmission time for each of a plurality of uplink positioning transmissions based at least in part on an estimated range between the UE and each of the serving base station and the one or more neighboring base stations. Some examples of the method, apparatus, and non-transitory computer-readable medium described above may further include processes, features, means, or instructions for transmitting each of the plurality of uplink positioning transmissions based at least in part on the determined transmission time for each of a plurality of uplink positioning transmissions.

Some examples of the method, apparatus, and non-transitory computer-readable medium described above may further include processes, features, means, or instructions for determining one or more frequencies in a dedicated radio frequency spectrum band for PRS transmissions of one or more base stations. Some examples of the method, apparatus, and non-transitory computer-readable medium described above may further include processes, features, means, or instructions for monitoring the one or more frequencies in the dedicated radio frequency spectrum band for the PRS transmissions. Some examples of the method, apparatus, and non-transitory computer-readable medium described above may further include processes, features, means, or instructions for transmitting measurements associated with the PRS transmissions using the shared radio frequency spectrum band.

Some examples of the method, apparatus, and non-transitory computer-readable medium described above may further include processes, features, means, or instructions for determining, based at least in part on the one or more parameters, a fixed or floating frame alignment for a serving base station and one or more neighboring base stations. Some examples of the method, apparatus, and non-transitory computer-readable medium described above may further include processes, features, means, or instructions for monitoring for a PRS transmission from one or more of the serving base station or the one or more neighboring base stations based at least in part on the fixed or floating frame alignment.

In some examples of the method, apparatus, and non-transitory computer-readable medium described above, the one or more parameters include one or more of a number of frames or subframes to monitor for a positioning reference signal.

In some examples of the method, apparatus, and non-transitory computer-readable medium described above, the one or more parameters include a maximum number of attempts to perform to identify a positioning reference signal from one or more neighboring base stations.

Some examples of the method, apparatus, and non-transitory computer-readable medium described above may further include processes, features, means, or instructions for transmitting, to a serving base station, one or more measurement reports generated from the positioning procedure.

In some examples of the method, apparatus, and non-transitory computer-readable medium described above, the one or more measurement reports include OTDOA measurements associated with one or more PRSs from one or more of the serving base station and one or more neighboring base stations.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
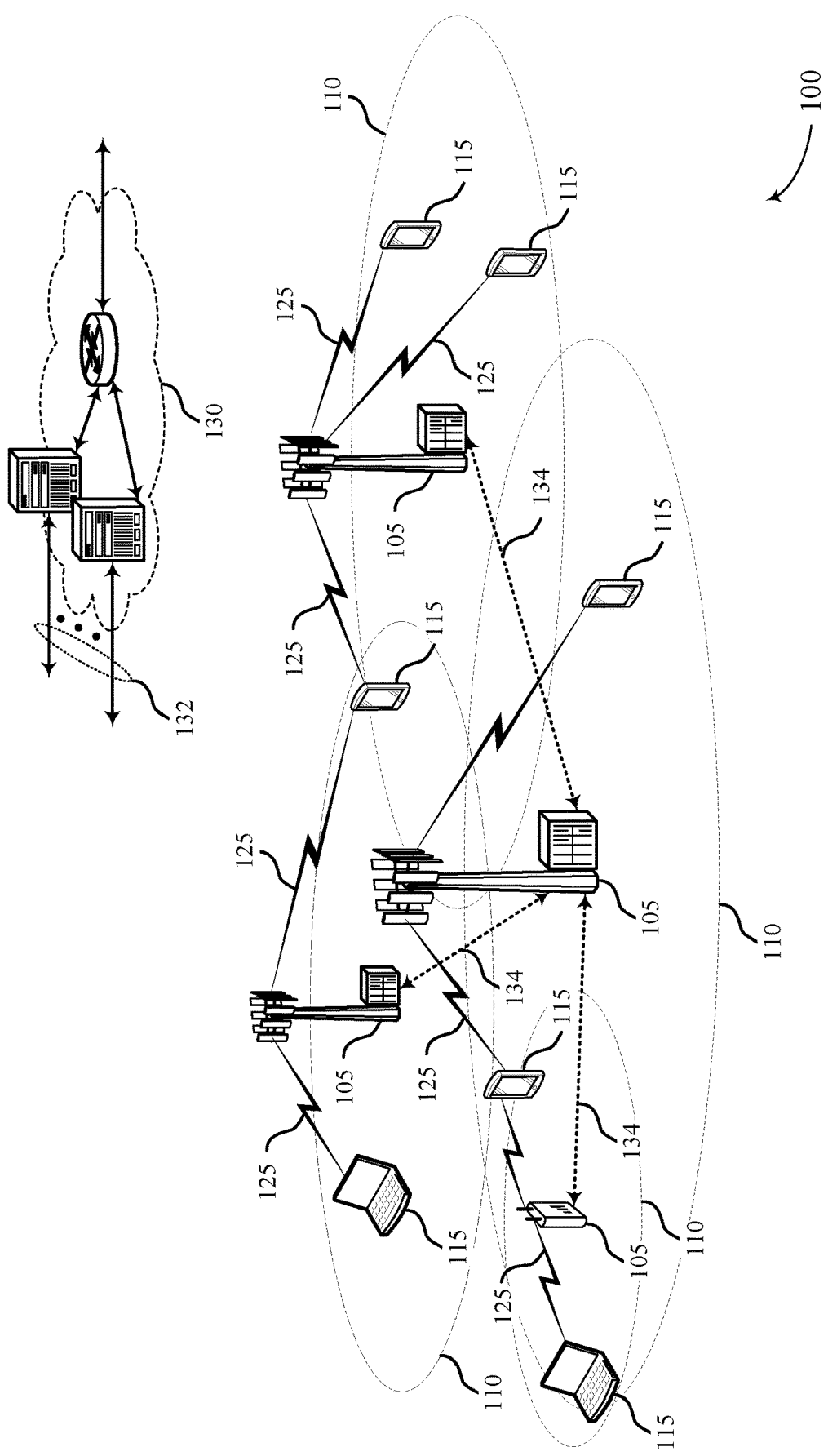
FIG. 1 illustrates an example of a system for wireless communication in accordance with aspects of the present disclosure.

Techniques are described in which a shared radio frequency spectrum is used for at least a portion of communications in a wireless communication system. In some examples, the shared radio frequency spectrum may be used for Long Term Evolution (LTE) or LTE-Advanced (LTE-A) communications, Licensed Assisted Access (LAA) communications, enhanced LAA (eLAA) communications, or MuLTEfire communications. The shared radio frequency spectrum may be used in combination with, or independent from, a dedicated radio frequency spectrum. The dedicated radio frequency spectrum may include a radio frequency spectrum licensed to particular users for particular uses. The shared radio frequency spectrum may include a radio frequency spectrum available for Wi-Fi use, a radio frequency spectrum available for use by different radio access technologies, or a radio frequency spectrum available for use by multiple mobile network operators (MNOs) in an equally shared or prioritized manner.

Some modes of communication may enable communication between a network access device and a UE over a shared radio frequency spectrum, or over different radio frequency spectrums (e.g., a dedicated radio frequency spectrum and a shared radio frequency spectrum). With increasing data traffic in cellular networks that use a dedicated radio frequency spectrum (e.g., a licensed radio frequency spectrum), offloading of at least some data traffic to a shared radio frequency spectrum may provide a mobile network operator (or cellular operator) with opportunities for enhanced data transmission capacity. Use of a shared radio frequency spectrum may also provide service in areas where access to a dedicated radio frequency spectrum is unavailable. In many cases, UEs may provide positioning information that may be used to determine UE position, which may be used for various purposes such as navigation or locating a UE. Positioning techniques used in dedicated radio frequency spectrum communications may be inadequate for determining UE position information in cases where a UE may communicate using shared radio frequency spectrum.

In some examples, positioning techniques for wireless communications devices using shared radio frequency spectrum are provided that may enhance positioning determination for devices operating using shared radio frequency spectrum. Such wireless communications devices may include machine-type-communication (MTC) UEs that may operate in a 2.4 GHz shared radio frequency spectrum band. In some cases, UEs may operate in a narrowband Internet-of-things (NB-IoT) deployment in a sub 1 GHz shared radio frequency spectrum band. In some MTC systems, positioning may provide valuable information (e.g., for efficient location of a device in a building or warehouse), and support for efficient and reliable positioning determination in a wireless system may be beneficial. Various multilateration techniques are established for dedicated radio frequency spectrum that provide for reliable and efficient positioning using observed time-difference of arrival (OTDOA) of positioning reference signals (PRSs) received at a UE in dedicated radio frequency spectrum.

However, such techniques as used in dedicated radio frequency spectrum may not be suitable for positioning using shared radio frequency spectrum. For example, frequency hopping may be used in some IoT deployments in the unlicensed bands, while dedicated PRS transmissions do not provide for frequency hopping. In many cases, a UE is expected to measure and report a reference signal time difference (RSTD) for different cells in the same frequency or in different frequencies at possibly different instances in time. In frequency hopping systems, however, the hopping pattern of each base station (or wireless access point) may be different and may be unknown to the UE. In addition, different base stations may follow a fixed frame structure or a floating frame structure which could be independent for each base station. Furthermore, in some cases a UE may need to detect PRS transmissions from base stations that may be relatively far away or the UE may be located in an area that has relatively poor channel conditions (e.g., inside a building or in a basement), which may negatively impact the UE's ability to receive a PRS from one or more base stations.

Various techniques are provided for identifying characteristics of communications in a shared radio frequency spectrum and determining one or more parameters for a positioning procedure for a UE based on the identified characteristics. In some cases, the one or more parameters may include frequency information for positioning reference signals, frequency hopping patterns for one or more base stations, a frame structure used by one or more base stations, a maximum number of frames of subframes to monitor for a positioning transmission, a maximum number of times to attempt positioning transmission reception for a base station, or any combination thereof. In some cases, a base station may transmit multiple positioning transmissions (e.g., PRS transmissions and coverage enhanced reference signals that may be used for RSTD measurements) that have different coverage levels that may enhance the ability for UEs to perform positioning measurements (e.g., RSTD measurements) using the signals.

In some cases, a UE may be configured to transmit an uplink positioning signal that may be received by multiple base stations and used for UE position determination. In other cases, a UE may be configured to monitor for a positioning transmissions (e.g., PRS transmissions) from multiple base stations on a dedicated radio frequency spectrum, and report measurements associated with the monitored positioning transmissions using a shared radio frequency spectrum.

Aspects of the disclosure are initially described in the context of a wireless communications system. Aspects of the disclosure are further illustrated by and described with reference to apparatus diagrams, system diagrams, and flowcharts that relate to positioning techniques for wireless communications devices using shared radio frequency spectrum.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network, or a New Radio (NR) network. In some cases, wireless communications system 100 may support enhanced broadband communications, ultra-reliable (i.e., mission critical) communications, low latency communications, and communications with low-cost and low-complexity devices. In some cases, the wireless communications system 100, or portions thereof, may operate using shared radio frequency spectrum, and may provide position determination for UEs 115 through techniques as discussed herein.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Some UEs 115, such as MTC or IoT devices, may be low cost or low complexity devices, and may provide for automated communication between machines (i.e., Machine-to-Machine (M2M) communication). M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. As mentioned above, in some cases position information for a MTC device may be provided that may allow a MTC device to be located, which may be beneficial for navigation or device location, for example. Furthermore, in cases where MTC devices use shared radio frequency spectrum, various techniques may provide for positioning determination using positioning signals and parameters that are adapted for communications using shared radio frequency spectrum.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one mobility management entity (MME), at least one S-GW, and at least one P-GW. The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

The core network 130 may provide user authentication, access authorization, tracking, IP connectivity, and other access, routing, or mobility functions. At least some of the network devices may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although in some cases WLAN networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with frequency division duplexing (FDD), time division duplexing (TDD), or a combination of both component carriers.

In some cases, wireless communications system 100 may utilize both licensed and shared or unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. In some examples, wireless communications system 100 may employ MuLTEfire communications operating in a stand-alone manner using shared radio frequency spectrum. When operating in unlicensed radio frequency spectrum bands, wireless devices such as base stations 105 and UEs 115 may employ LBT procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on FDD, TDD, or a combination of both.

Figure 2:
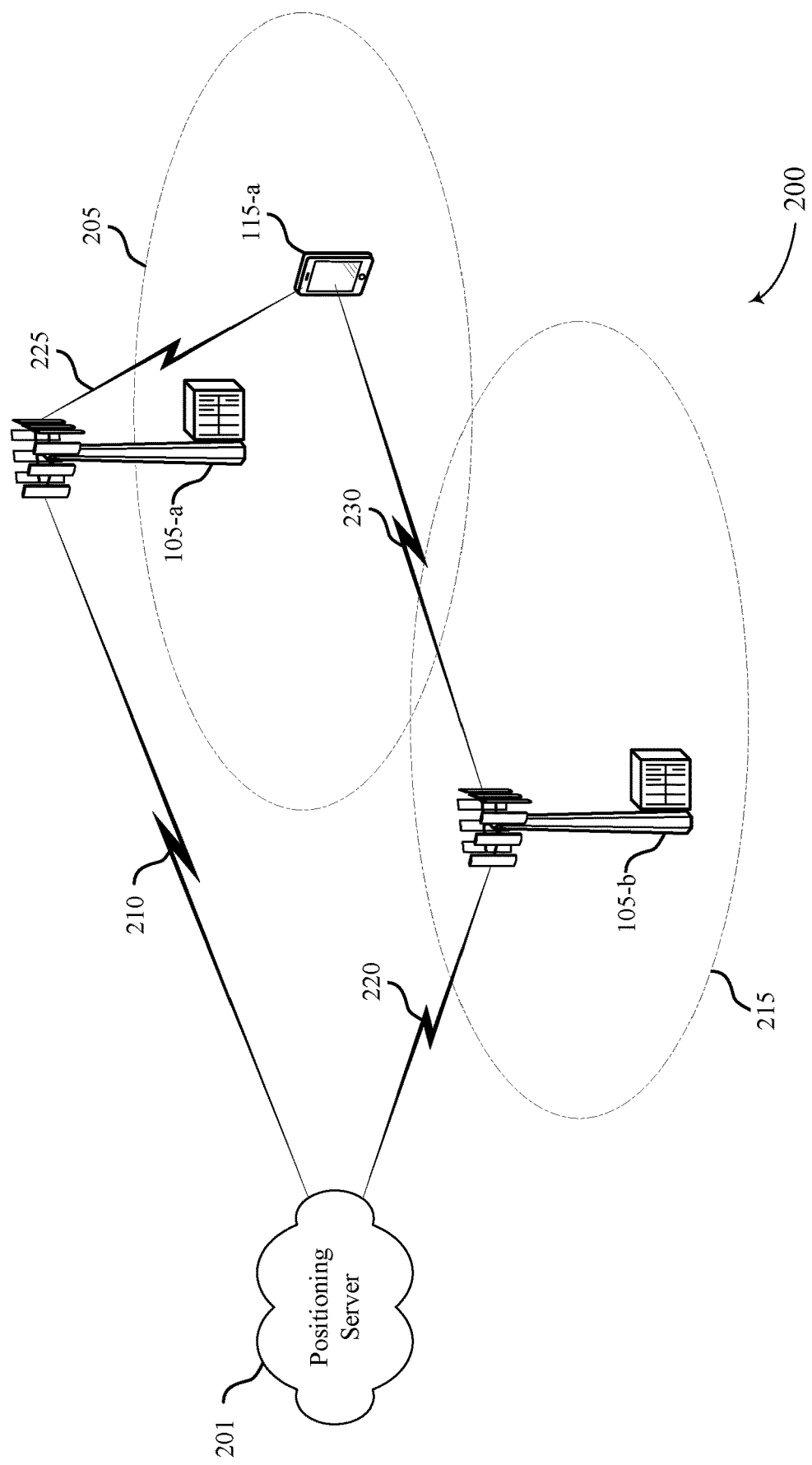
FIG. 2 illustrates an example of a portion of a system for wireless communication in accordance with aspects of the present disclosure.

FIG. 2 illustrates an example of a wireless communications system 200 that supports positioning techniques for wireless communications devices using shared radio frequency spectrum. Wireless communications system 200 may include base stations 105-*a* and 105-*b*, UE 115-*a*, and a positioning server 201, which may be examples of a base station 105, a UE 115, or an entity of the core network 130, as described with reference to FIG. 1. In some cases, the positioning server 201 may be incorporated in base station 105-*a*, which may be a serving base station to the UE 115-*a*. Base station 105-*b* may be a neighboring base station, and positioning signals from multiple base stations 105 may be used to determine a position of the UE 115-*a* according to time-difference of arrival measurements and multilateration techniques.

In some cases, UE 115-*a* may be within a geographic coverage area 205 of base station 105-*a*, and may communicate with base station 105-*a* on communications link 225. UE 115-*a* may be outside of a geographic coverage area 215 of base station 105-*b*, but may still receive a positioning transmission (e.g., a PRS transmission) of base station 105-*b* on communications link 230 and may measure a time difference of arrival in an OTDOA measurement procedure.

The geographic coverage area 205 and the geographic coverage area 215 may be examples of a geographic coverage area 110 as described with reference to FIG. 1. Base station 105-*a* may communicate with positioning server 201 over a communication link 210, and base station 105-*b* may communicate with positioning server 201 over a communication link 220. Communication link 210 and communication link 220 may be wired or wireless communication links.

In some examples, the UE 115-*a* may be a MTC device that may operate in a 2.4 GHz shared radio frequency spectrum band in a NB-IoT deployment. In other examples, UE 115-*a* may operate in a sub 1 GHz shared radio frequency spectrum band. In some examples, the UE 115-*a* may operate using shared radio frequency spectrum for communications link 225 and communications link 230. The communications link 225 may be a narrowband link (e.g., a 180 kHz link) that may use frequency hopping techniques to achieve enhanced frequency diversity for transmissions using communications link 225. In frequency hopping systems, however, the hopping pattern of each base station 105 may be different and may be unknown to the UE 115-*a*. In some cases, the serving base station 105-*a* may provide one or more parameters to the UE 115-*a* that indicate a frequency hopping pattern for PRS transmissions of the serving base station 105-*a* as well as one or more neighboring base stations such as base station 105-*b*. The UE 115-*a* may use this frequency hopping parameter to monitor for PRS transmissions and perform OTDOA measurements.

In addition, base station 105-*a* and base station 105-*b* may follow different fixed/floating frame structures. For example, base station 105-*a* may use a fixed frame structure, and base station 105-*b* may use a floating frame structure. Other base stations may use a fixed or floating frame structure, which may be independent for each base station. In some examples, in order to detect positioning transmissions (e.g., PRS transmissions) that may be transmitted using different fixed/floating frame structures, the base station 105-*a* may provide one or more parameters to the UE 115-*a* that may indicate whether a fixed or a floating frame structure may be assumed for each base station 105. In some examples, the frame structure may be a network specific configuration, and the UE 115-*a* may be configured to assume neighboring base stations 105 of a deployment follow the same frame structure as the serving base station 105-*a*. Based on the configured parameter(s) for frame structure, the UE 115-*a* may monitor for positioning transmissions from the different base stations 105, and may transmit a measurement report to serving base station 105-*a*. Positioning server 201 may use received measurement reports to determining positioning information for the UE 115-*a*.

In some cases, neighboring base station 105-*b* may be located relatively far away from the UE 115-*a*, or channel conditions between UE 115-*a* and base station 105-*b* may be relatively poor for other reasons (e.g., due to UE 115-*a* being located deep within a building or in a basement), which may negatively impact UE 115-*a* reception of a PRS from base station 105-*b* via communications link 230. In some examples, base stations 105 may transmit positioning signals with coverage enhancement that may help increase the likelihood of successful reception at UE 115-*a*. For example, base station 105-*b* may transmit a regular PRS, which may be detectable by the UE 115-*a* at −7 dB or −8 dB, on a first periodic basis. On a second periodic basis, the base station 105-*b* may transmit second positioning transmissions that may be detectable by the UE 115-*a* at −10 dB or −15 dB. The second positioning transmissions may include, for example, a PRS that is transmitted using coverage enhancement techniques such as increased transmit power, repetition of transmissions with redundant information, modulation and coding that may enhance detection, or any combination thereof. UE 115-*a* may receive the PRS and/or second positioning transmissions from base stations 105, perform OTDOA measurements, and provide positioning measurement reports in a similar manner as discussed above. In some cases, the serving base station 105-*a* may provide one or more parameters to the UE 115-*a* that indicate when different positioning transmissions may be transmitted.

As discussed above, wireless communications system 200 may operate using shared radio frequency spectrum, and base stations 105 may perform a LBT procedure prior to transmitting positioning transmissions. Thus, a base station 105 is not guaranteed to transmit a positioning transmission at a time when the UE 115-*a* may expect such a transmission. In some cases, one or more parameters may be provided that may configure the UE 115-*a* with a maximum number of frames of subframes to monitor for a positioning transmission, a maximum number of times to attempt positioning transmission reception for a base station, or any combination thereof. If the UE 115-*a* does not detect a positioning transmission within the maximum, the UE 115-*a* may move on to monitor for transmissions from another base station 105.

In certain situations, positioning using OTDOA may be time consuming and may result in inefficient power consumption when performed in unlicensed spectrum due to the UE needing to monitor different frequencies for each cell and the need to detect transmissions from each cell before processing PRS signals. In particular, if a transmission is not immediately detected, the UE may need to wait for a given frame period (e.g., in fixed frame structure situations), or continuously search for downlink positioning transmissions (e.g., in floating frame structure situations). In some examples, instead of or in addition to UE 115-*a* monitoring of downlink positioning transmissions, the UE 115-*a* may be configured to transmit an uplink positioning signal. Such an uplink positioning signal may be received by both base station 105-*a* and base station 105-*b*, and one or more other neighboring base stations, and used for UE 115-*a* position determination. For example, base stations 105 may monitor for the uplink positioning transmissions of UE 115-*a* and may provide measurements associated with the uplink positioning transmission to positioning server 201, which may use uplink time difference of arrival (UTDOA) for UE 115-*a* position determination. In some cases, the uplink positioning transmissions may be transmitted without the UE 115-*a* performing a LBT procedure. For example, the uplink positioning transmissions may be transmitted on a narrow bandwidth and/or span a short enough duration that the transmissions may be exempt from LBT procedures. In such examples, serving base station 105-*a* may configure the UE 115-*a* with one or more parameters, such as a frequency hopping configuration on each base station 105, and the UE 115-*a* may transmit the uplink positioning signal for UTDOA to each base station 105-*a* on the configured frequency without LBT.

In some cases, the amount of transmission time and/or transmission waveform may be different for each base station 105 in order to enhance the likelihood of successful reception. For example, serving base station 105-*a* may have a rough idea of which base stations 105 are in range of the UE 115-*a* and may configure different transmission times (e.g., longer transmission times for base stations that are farther away) and/or transmission waveforms (e.g., modulation and coding schemes selected based on base station range) for each base station 105 to enhance likelihood of successful reception of the uplink positioning transmission. In some cases, the UE 115-*a* may simply be configured to use one particular frequency for uplink positioning transmissions, and may hop to that frequency to transmit the uplink positioning transmissions.

In further examples, UE 115-*a*, additionally or alternatively, may be configured to monitor for a positioning transmissions (e.g., PRS transmissions) from multiple base stations 105 on a licensed frequency, and report measurements associated with the monitored positioning transmissions using shared radio frequency spectrum. In such cases, the UE 115-*a* may be configured with one or more parameters that provide one or more dedicated frequencies that may be monitored for downlink positioning transmissions. The UE 115-*a* may move to each provided frequency and perform the measurement, and provide a measurement report using a shared frequency. The UE 115-*a* may acquire at least time and frequency synchronization on one cell in the licensed spectrum, and may report this cell based on which RSTD is calculated to positioning server 201 so that the server may perform the appropriate computation.

Figure 3:
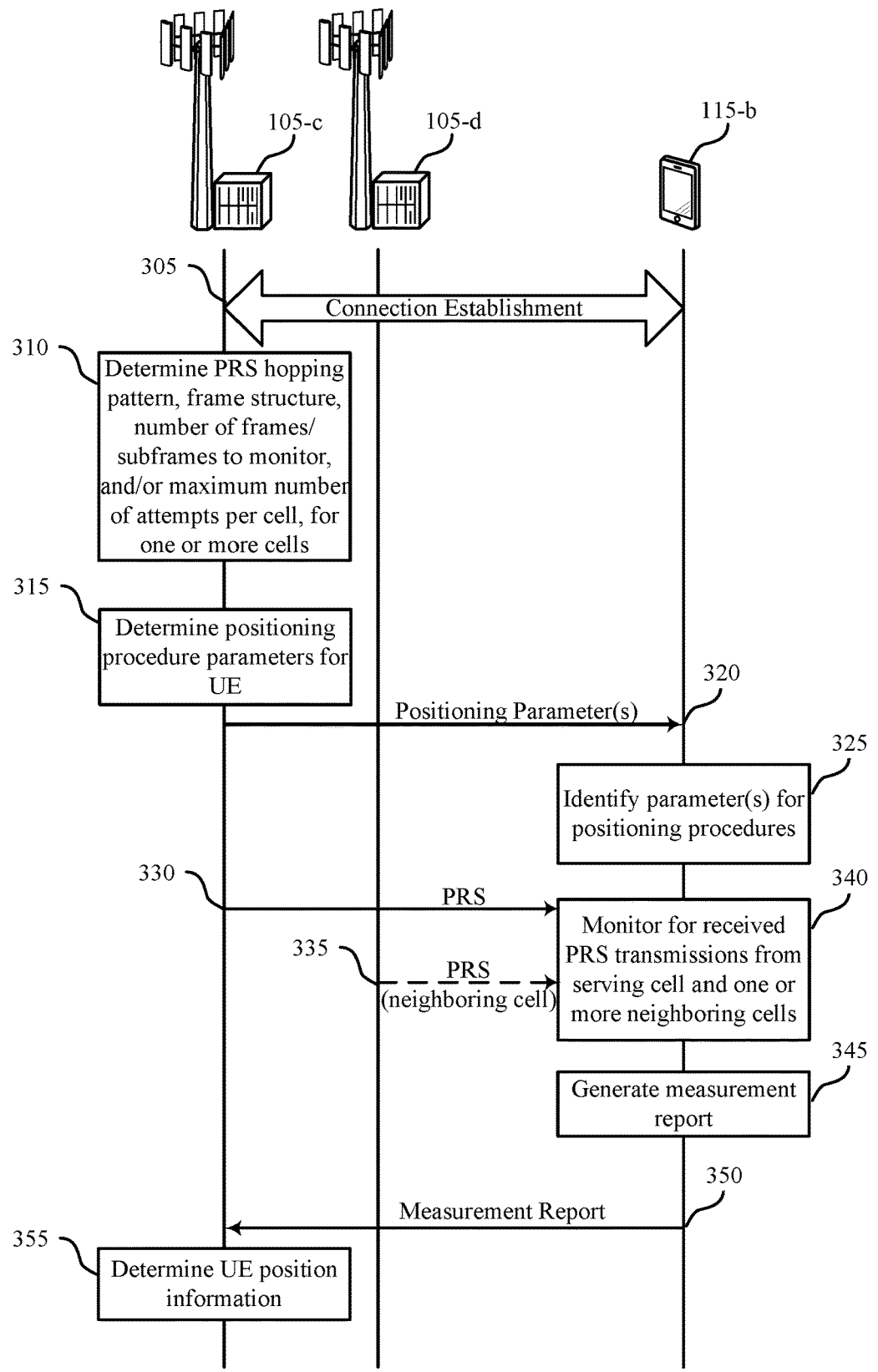
FIG. 3 illustrates an example of a process flow in accordance with aspects of the present disclosure.

FIG. 3 illustrates an example of a process flow 300 for positioning techniques for wireless communications devices using shared radio frequency spectrum. Process flow 300 may include base station 105-*c*, base station 105-*d*, and a UE 115-*b*, which may be examples of the corresponding devices described with reference to FIG. 1-2. In this example, base station 105-*c* may be a serving base station, and may perform a connection establishment 305 with UE 115-*b* according to established connection establishment techniques.

At block 310, base station 105-*c* may determine a PRS hopping pattern, frame structure, number of frames/subframes to monitor, and/or maximum number of monitoring attempts per cell, for one or more cells or base stations. For example, the base station 105-*c* may determine a PRS hopping pattern for neighboring base stations, which may include base station 105-*d*. In some examples, the serving base station 105-*c* may also determine information needed for the UE 115-*b* to perform transmission detection for the purpose of detecting PRS transmissions (e.g., information for detection of a cell-specific reference signal (CRS)).

At block 315, the serving base station 105-*c* may determine positioning procedure parameters for the UE 115-*a*. Such a determination may include determining how to set one or more parameters to allow the UE 115-*a* to efficiently detect positioning transmissions of different base stations 105. In some examples, the parameter(s) may include frequency hopping patterns, fixed or floating frame structures, number of frames/subframes to monitor, and/or maximum number of monitoring attempts per cell, or combinations thereof, for the different base stations. In some examples, the parameter(s) may provide an index to a look-up table or may be mapped to certain values for a base station 105. The serving base station 105-*c* may transmit the positioning parameter(s) 320 to the UE 115-*b*.

At block 325, the UE 115-*b* may identify the parameter(s) for positioning procedures. As discussed above, such parameters may include, for example, frequency hopping patterns, information for transmission detection, fixed or floating frame structures, number of frames/subframes to monitor, and/or maximum number of monitoring attempts per cell, or combinations thereof, for the different base stations.

At block 340, the UE 115-*b* may monitor for received positioning transmissions, such as PRS transmissions, from the serving base station 105-c and one or more neighboring base stations 105-d. During the monitoring, for example, the UE 115-b may detect a PRS 330 from serving base station 105-c and a PRS 335 from neighboring base station 105-d. Monitoring may be performed using the information from the parameters, such as by hopping to a frequency associated with a hopping pattern of neighboring base station 105-d, for example. As discussed above, in some examples, base stations 105 may transmit multiple types of positioning transmissions, which may have different coverages that may enable UE 115-b with relatively poor channel conditions to be more likely to detect a positioning transmission. The UE 115-b may monitor each base station 105 (if needed on a different frequency) for the configured amount of time to detect downlink transmissions. If a positioning transmission is detected, the UE 115-b processes the transmission, and if a positioning transmission is not detected the UE 115-b may revisit that base station at a later time before the final measurement report is made to the location server. The maximum number of visits to each base station can also be configured or can be pre-specified.

At block 345, the UE 115-b may generate a measurement report. Such a measurement report may include OTDOA measurements for detected positioning transmissions from different base stations 105, as discussed above. The UE 115-b may transmit the measurement report 350 to the serving base station 105-c, which may provide the report to a positioning server for use in positioning determinations.

At block 355, the serving base station 105-c may determine UE 115-b position information based on the measurement report. In some cases, a positioning server at the base station 105-c may determine position information. In other cases, the base station 105-c may provide the measurement report to a positioning server at a core network, which may determine position information.

Figure 4:
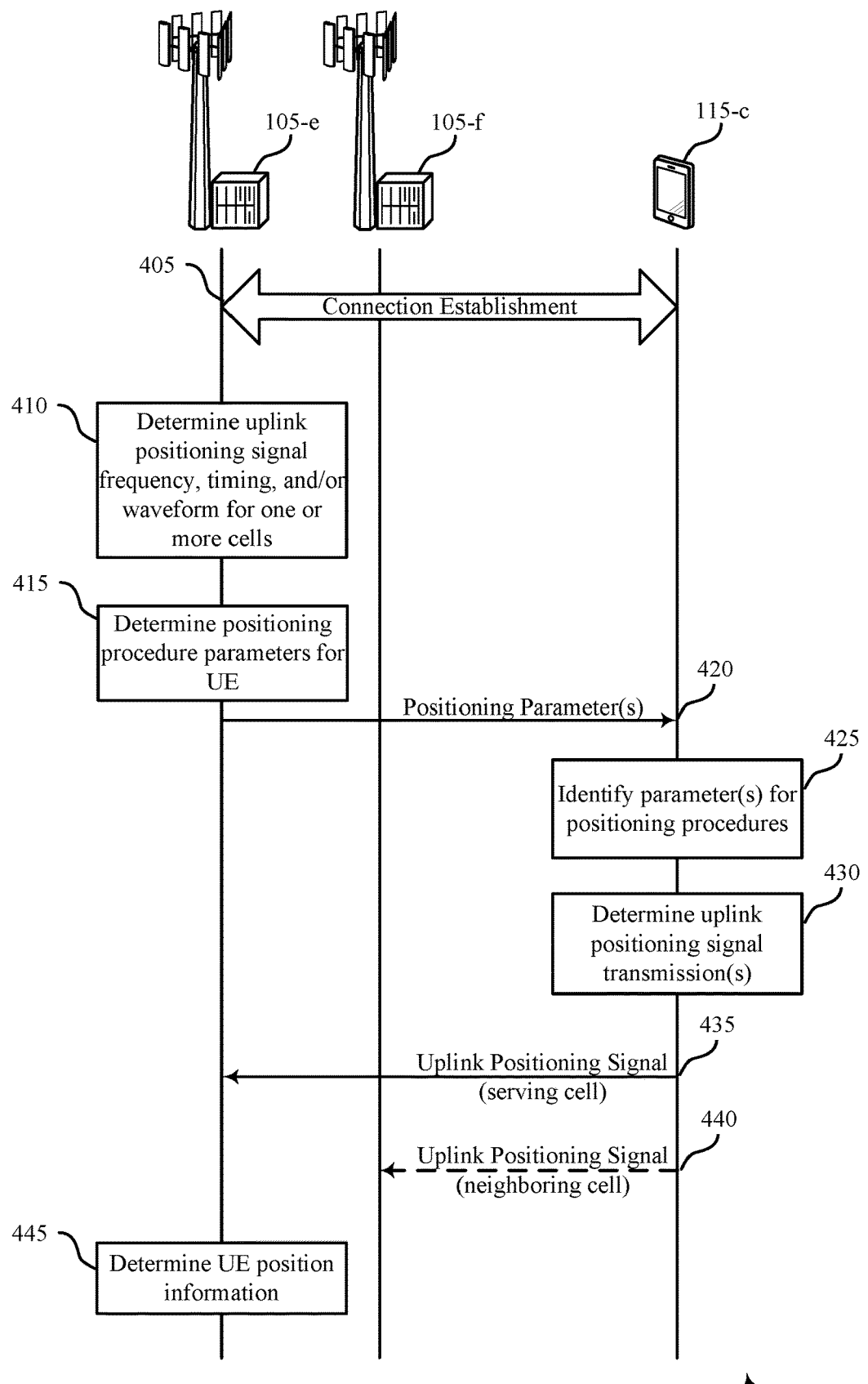
FIG. 4 illustrates an example of another process flow in accordance with aspects of the present disclosure.

FIG. 4 illustrates an example of a process flow 400 for positioning techniques for wireless communications devices using shared radio frequency spectrum. Process flow 400 may include base station 105-e, base station 105-f, and a UE 115-c, which may be examples of the corresponding devices described with reference to FIG. 1-2. In this example, base station 105-e may be a serving base station, and may perform a connection establishment 405 with UE 115-c according to established connection establishment techniques.

At block 410, base station 105-e may determine an uplink positioning signal frequency, timing, and/or waveform for one or more cells to which the UE 115-c may transmit an uplink positioning signal. For example, the base station 105-e may determine a PRS hopping pattern for neighboring base stations, which may include base station 105-f.

At block 415, the serving base station 105-e may determine positioning procedure parameters for the UE 115-a. Such a determination may include determining how to set one or more parameters to allow the UE 115-a to transmit an uplink positioning signal to be received at different base stations 105. In some examples, the parameter(s) may include frequency hopping patterns, fixed or floating frame structures, transmission parameters (e.g., transmission power or waveform), or combinations thereof, for the different base stations. In some examples, the parameter(s) may provide an index to a look-up table or may be mapped to certain values for a base station 105. The serving base station 105-e may transmit the positioning parameter(s) 420 to the UE 115-c.

At block 425, the UE 115-c may identify the parameter(s) for positioning procedures. As discussed above, such parameters may include, for example, frequency hopping patterns, fixed or floating frame structures, transmission parameters (e.g., transmission power or waveform), or combinations thereof, for the different base stations.

At block 430, the UE 115-c may determine uplink positioning signal transmission(s). The UE 115-c may transmit uplink positioning signal 435 to the serving base station 105-e, and may transmit uplink positioning signal 440 to the neighboring base station 105-f. In some examples, the uplink transmissions may be made without performing a LBT procedure. The amount of transmission time, or a transmission waveform, could be different for each base station, in some examples, which may be configured in one or more of the positioning parameters provided by the serving base station 105-e to the UE 115-c. Such different transmission times and/or waveforms may increase the likelihood of a base station 105 detecting the uplink positioning signal.

At block 445, the serving base station 105-e may determine UE 115-c position information based on the uplink positioning transmissions. In some examples, each of the base stations 105 that receive an uplink positioning transmission from UE 115-c may provide information from the transmission to a positioning server (e.g., at a core network or at base station 105-e), which may use UTDOA techniques to determine UE 115-c position.

Such uplink transmissions may allow the UE 115-c to avoid all or some OTDOA measurements, which may be relatively time-consuming and not power efficient in unlicensed spectrum, as the UE 115-c needs to monitor different frequencies for each cell and detect transmissions from each cell before processing PRS. Further, if a downlink transmission is not immediately detected, then UE 115-c has to wait for a given frame period (assuming fixed frame structure) or continuously search (assuming floating frame structure). Thus, UTDOA based on UE transmissions may be more suitable in the unlicensed spectrum for IoT as UE does not perform LBT.

Figure 5:
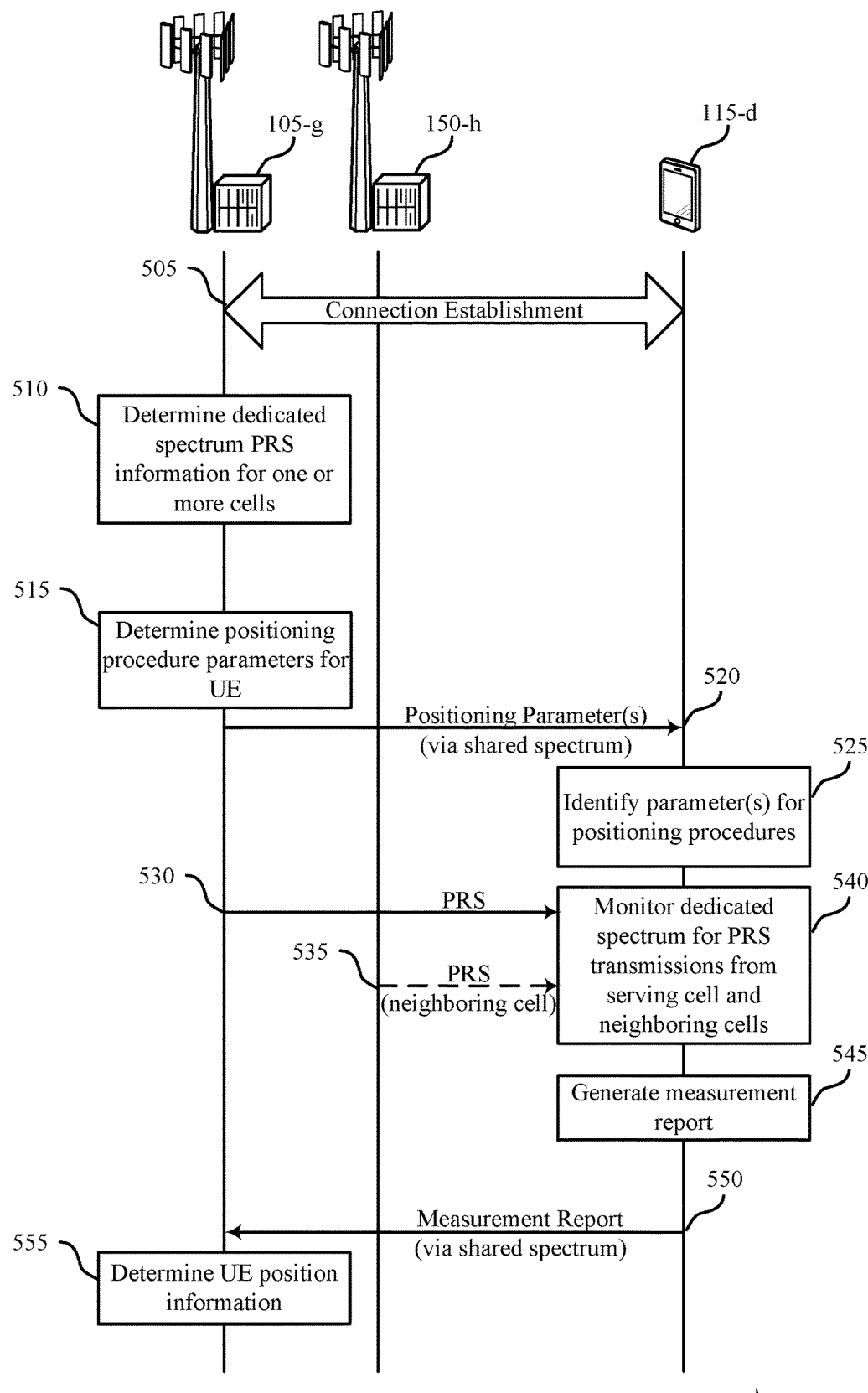
FIG. 5 illustrates an example of another process flow in accordance with aspects of the present disclosure.

FIG. 5 illustrates an example of a process flow 500 for positioning techniques for wireless communications devices using shared radio frequency spectrum. Process flow 500 may include base station 105-g, base station 105-h, and a UE 115-d, which may be examples of the corresponding devices described with reference to FIG. 1-2. In this example, base station 105-g may be a serving base station, and may perform a connection establishment 505 with UE 115-d according to established connection establishment techniques.

At block 510, base station 105-g may determine dedicated spectrum PRS information for one or more cells. For example, the base station 105-g may determine one or more base stations that transmit PRS on licensed frequencies, which may be used by UE 115-d for positioning measurements.

At block 515, the serving base station 105-g may determine positioning procedure parameters for the UE 115-a. Such a determination may include determining one or more base stations and associated licensed frequencies that may be monitored for PRS transmissions, for example. The serving base station 105-g may transmit the positioning parameter(s) 520 to the UE 115-d via shared spectrum.

At block 525, the UE 115-d may identify the parameter(s) for positioning procedures. As discussed above, such parameters may include, for example, dedicated frequencies to monitor for different base stations 105 for PRS transmissions. For example, UE 115-d may need to acquire at least time and frequency synchronization on licensed frequency transmissions of the serving base station 105-g and neighboring base station 105-h.

At block 540, the UE 115-d may monitor for received positioning transmissions, such as PRS transmissions, from the serving base station 105-g and one or more neighboring base stations 105-h. During the monitoring, for example, the UE 115-d may detect a PRS 530 from serving base station 105-g on a licensed frequency and a PRS 535 from neighboring base station 105-h on a licensed frequency. Monitoring may be performed using the information from the parameters, such as by monitoring a licensed frequency associated with each base station 105, for example. If a positioning transmission is detected, the UE 115-d processes the transmission, and if a positioning transmission is not detected the UE 115-d may revisit that base station at a later time before the final measurement report is made to the location server.

At block 545, the UE 115-d may generate a measurement report. Such a measurement report may include OTDOA measurements for detected positioning transmissions from different base stations 105, as discussed above. The UE 115-d may include in the report each base station on which RSTD is calculated, so that the positioning server may perform the proper positioning computations. The UE 115-d may transmit the measurement report 550 to the serving base station 105-g via shared radio frequency spectrum, which may provide the report to a positioning server for use in positioning determinations.

At block 555, the serving base station 105-g may determine UE 115-d position information based on the measurement report. In some cases, a positioning server at the base station 105-g may determine position information. In other cases, the base station 105-g may provide the measurement report to a positioning server at a core network, which may determine position information.

Figure 6:
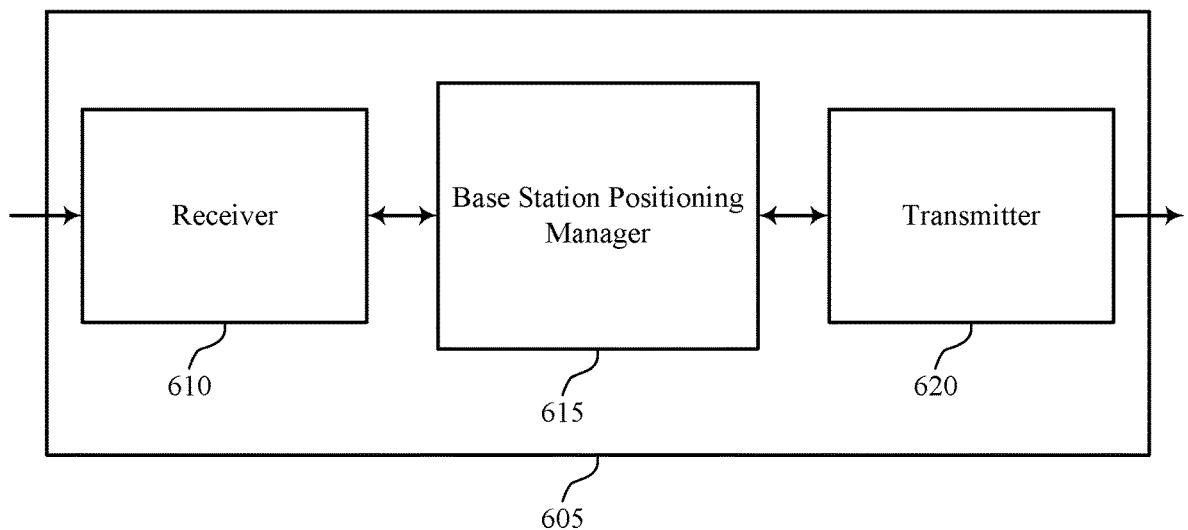
FIGS. 6 through 8 show block diagrams of a device in accordance with aspects of the present disclosure.

FIG. 6 shows a block diagram 600 of a wireless device 605 that supports positioning techniques for wireless communications devices using shared radio frequency spectrum in accordance with various aspects of the present disclosure. Wireless device 605 may be an example of aspects of a base station 105 as described with reference to FIG. 1. Wireless device 605 may include receiver 610, base station positioning manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to positioning techniques for wireless communications devices using shared radio frequency spectrum, etc.). Information may be passed on to other components of the device. The receiver 610 may be an example of aspects of the transceiver 935 described with reference to FIG. 9.

Base station positioning manager 615 may be an example of aspects of the base station positioning manager 915 described with reference to FIG. 9.

Base station positioning manager 615 and/or at least some of its various sub-components may be implemented in hardware, software executed by a processor, firmware, or any combination thereof. If implemented in software executed by a processor, the functions of the base station positioning manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station positioning manager 615 and/or at least some of its various sub-components may be physically located at various positions, including being distributed such that portions of functions are implemented at different physical locations by one or more physical devices. In some examples, base station positioning manager 615 and/or at least some of its various sub-components may be a separate and distinct component in accordance with various aspects of the present disclosure. In other examples, base station positioning manager 615 and/or at least some of its various sub-components may be combined with one or more other hardware components, including but not limited to a receiver, a transmitter, a transceiver, one or more other components described in the present disclosure, or a combination thereof in accordance with various aspects of the present disclosure.

Base station positioning manager 615 may identify a user equipment (UE) that is using frequency hopping in a shared radio frequency spectrum band for wireless communications and determine, based on the frequency hopping, one or more parameters for performing a positioning procedure to determine a position of the UE.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may include a single antenna, or it may include a set of antennas. Transmitter 620 may transmit the one or more parameters to the UE.

Figure 7:
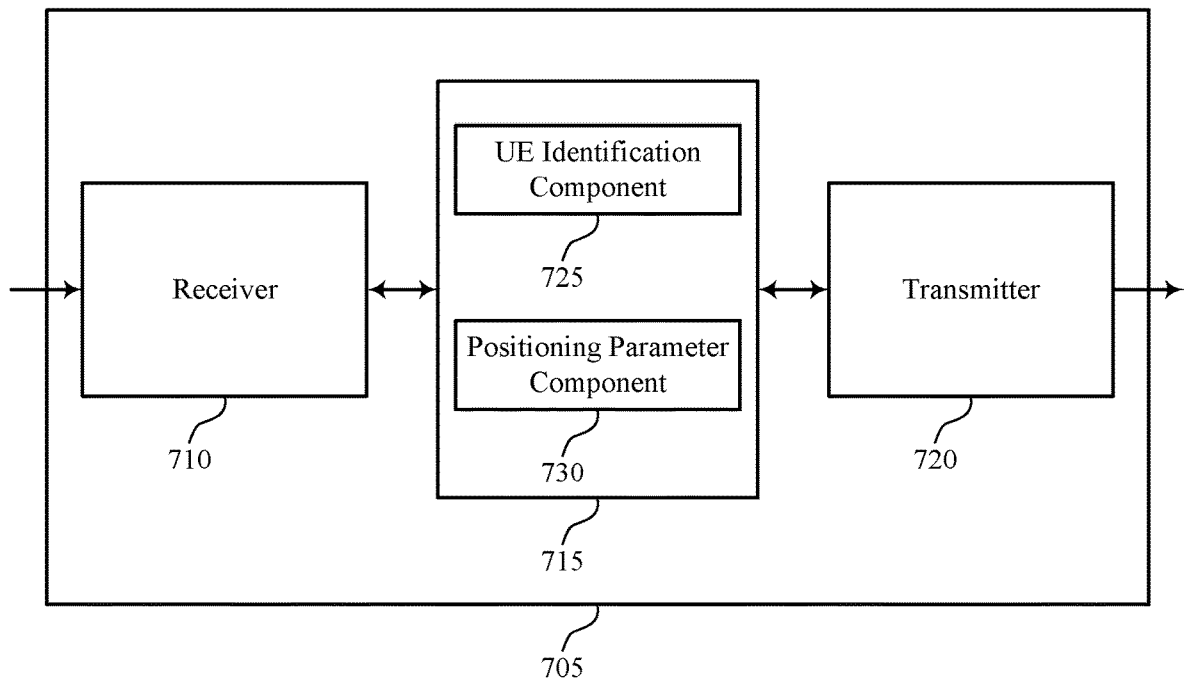

FIG. 7 shows a block diagram 700 of a wireless device 705 that supports positioning techniques for wireless communications devices using shared radio frequency spectrum in accordance with various aspects of the present disclosure. Wireless device 705 may be an example of aspects of a wireless device 605 or a base station 105 as described with reference to FIGS. 1 and 6. Wireless device 705 may include receiver 710, base station positioning manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to positioning techniques for wireless communications devices using shared radio frequency spectrum, etc.). Information may be passed on to other components of the device. The receiver 710 may be an example of aspects of the transceiver 935 described with reference to FIG. 9.

Base station positioning manager 715 may be an example of aspects of the base station positioning manager 915 described with reference to FIG. 9. Base station positioning manager 715 may also include UE identification component 725 and positioning parameter component 730. UE identification component 725 may identify a UE that is using frequency hopping in a shared radio frequency spectrum band for wireless communications.

Positioning parameter component 730 may determine a first parameter of the one or more parameters based on the PRS frequency hopping pattern for the serving base station and one or more neighboring base stations, and determine, based on the frequency hopping, one or more parameters for performing a positioning procedure to determine a position of the UE. In some cases, positioning parameter component 730 may determine a first parameter of the one or more parameters based on the identified frequencies. In some cases, positioning parameter component 730 may determine a second parameter of the one or more parameters based on determined transmission times for one or more uplink positioning transmissions. In some cases, positioning parameter component 730 may determine a first parameter of the one or more parameters based on the fixed or floating frame alignment for one or more of the serving base station or the one or more neighboring base stations. In some cases, the one or more parameters include information for the UE to perform transmission detection for a serving base station and one or more neighboring base stations. In some cases, the one or more parameters include one or more of a number of frames or subframes that the UE is to monitor for a positioning reference signal. In some cases, the one or more parameters include a maximum number of attempts that the UE is to perform to identify a positioning reference signal from one or more neighboring base stations.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may include a single antenna, or it may include a set of antennas.

Figure 8:
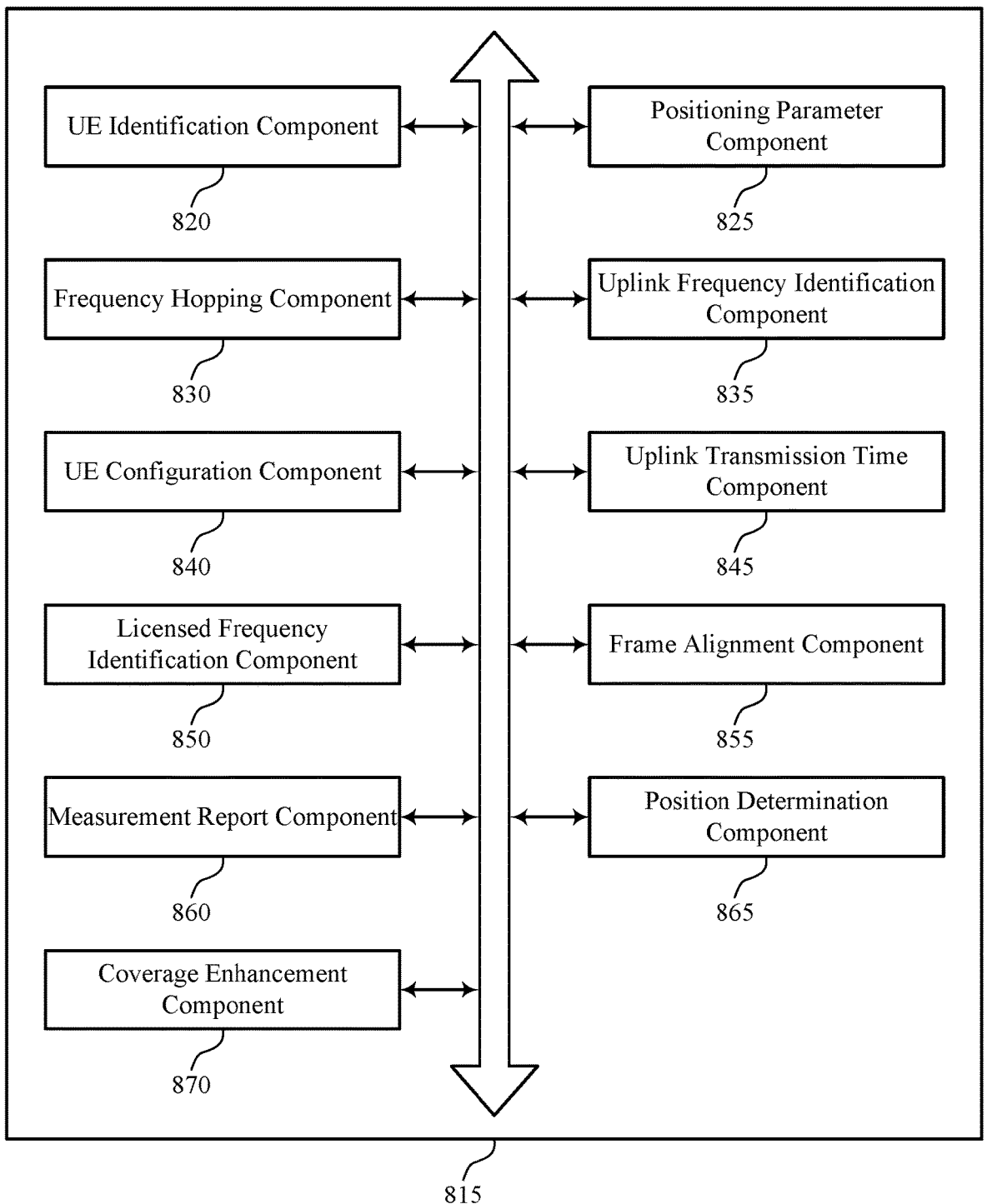

FIG. 8 shows a block diagram 800 of a base station positioning manager 815 that supports positioning techniques for wireless communications devices using shared radio frequency spectrum in accordance with various aspects of the present disclosure. The base station positioning manager 815 may be an example of aspects of a base station positioning manager 615, a base station positioning manager 715, or a base station positioning manager 915 described with reference to FIGS. 6, 7, and 9. The base station positioning manager 815 may include UE identification component 820, positioning parameter component 825, frequency hopping component 830, uplink frequency identification component 835, UE configuration component 840, uplink transmission time component 845, licensed frequency identification component 850, frame alignment component 855, measurement report component 860, position determination component 865, and coverage enhancement component 870. Each of these modules may communicate, directly or indirectly, with one another (e.g., via one or more buses).

UE identification component 820 may identify a UE that is using frequency hopping in a shared radio frequency spectrum band for wireless communications.

Positioning parameter component 825 may determine a first parameter of the one or more parameters based on the PRS frequency hopping pattern for the serving base station and one or more neighboring base stations, determine. In some cases, positioning parameter component 825 may determine a first parameter of the one or more parameters based on the identified frequencies. In some cases, positioning parameter component 825 may determine a second parameter of the one or more parameters based on the determined transmission times for an uplink positioning transmission. In some cases, positioning parameter component 825 may determine a first parameter of the one or more parameters based on the fixed or floating frame alignment for one or more of the serving base station or the one or more neighboring base stations. In some cases, the one or more parameters include information for the UE to perform transmission detection for a serving base station and one or more neighboring base stations. In some cases, the one or more parameters include one or more of a number of frames or subframes that the UE is to monitor for a positioning reference signal. In some cases, the one or more parameters include a maximum number of attempts that the UE is to perform to identify a positioning reference signal from one or more neighboring base stations.

Frequency hopping component 830 may identify a PRS frequency hopping pattern for a serving base station and one or more neighboring base stations. Uplink frequency identification component 835 may identify a frequency for one or more uplink positioning transmissions of the UE for each of a serving base station and one or more neighboring base stations.

UE configuration component 840 may configure the UE to monitor the one or more frequencies in the dedicated radio frequency spectrum band for the PRS transmissions and transmit measurements associated with the PRS transmissions using the shared radio frequency spectrum band. In some cases, UE configuration component 840 may configure the UE to transmit the one or more uplink positioning transmissions without performing a listen-before-talk (LBT) procedure.

Uplink transmission time component 845 may determine a transmission time for each uplink positioning transmission based on an estimated range between the UE and each of the serving base station and the one or more neighboring base stations.

Licensed frequency identification component 850 may determine one or more frequencies in a dedicated radio frequency spectrum band for PRS transmissions of one or more base stations. Frame alignment component 855 may determine a fixed or floating frame alignment for a serving base station and one or more neighboring base stations. Measurement report component 860 may receive, from the UE, one or more measurement reports generated from the positioning procedure. In some cases, the one or more measurement reports include OTDOA measurements associated with one or more PRSs from one or more of a serving base station and one or more neighboring base stations.

Position determination component 865 may determine a position of the UE based on the one or more measurement reports. Coverage enhancement component 870 may transmit a first PRS transmission and a second PRS transmission to the UE, where the first PRS transmission provides increased coverage relative to the second PRS transmission.

Figure 9:
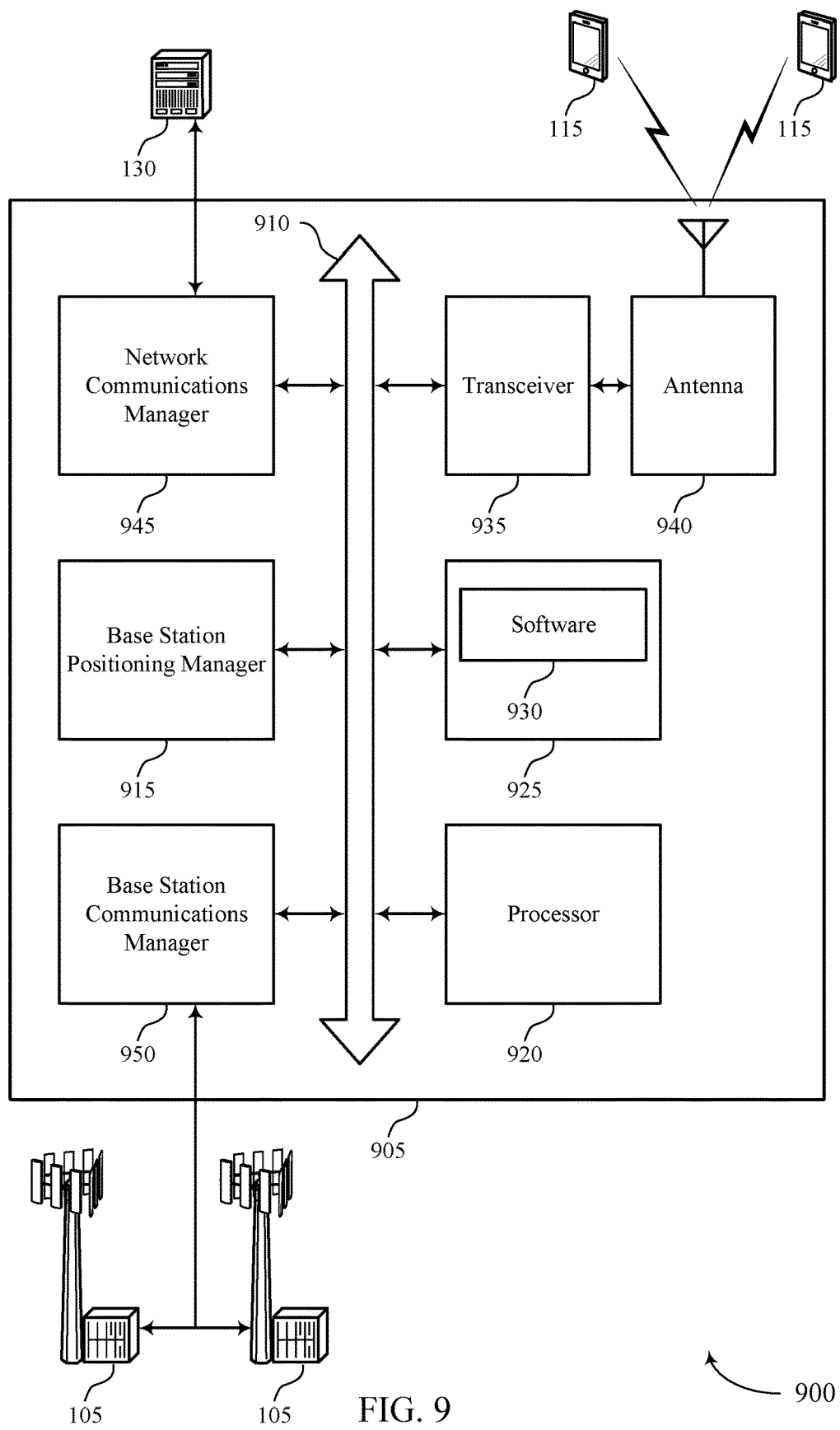
FIG. 9 illustrates a block diagram of a system including a base station in accordance with aspects of the present disclosure.

FIG. 9 shows a diagram of a system 900 including a device 905 that supports positioning techniques for wireless communications devices using shared radio frequency spectrum in accordance with various aspects of the present disclosure. Device 905 may be an example of or include the components of wireless device 605, wireless device 705, or a base station 105 as described above (e.g., with reference to FIGS. 1, 6 and 7). Device 905 may include components for bi-directional voice and data communications including components for transmitting and receiving communications, including base station positioning manager 915, processor 920, memory 925, software 930, transceiver 935, antenna 940, network communications manager 945, and base station communications manager 950. These components may be in electronic communication via one or more busses (e.g., bus 910). Device 905 may communicate wirelessly with one or more UEs 115.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting positioning techniques for wireless communications devices using shared radio frequency spectrum).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware and/or software operation such as the interaction with peripheral components or devices.

Software 930 may include code to implement aspects of the present disclosure, including code to support positioning techniques for wireless communications devices using shared radio frequency spectrum. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

Network communications manager 945 may manage communications with the core network (e.g., via one or more wired backhaul links). For example, the network communications manager 945 may manage the transfer of data communications for client devices, such as one or more UEs 115.

Base station communications manager 950 may manage communications with other base station 105, and may include a controller or scheduler for controlling communications with UEs 115 in cooperation with other base stations 105. For example, the base station communications manager 950 may coordinate scheduling for transmissions to UEs 115 for various interference mitigation techniques such as beamforming or joint transmission. In some examples, base station communications manager 950 may provide an X2 interface within an Long Term Evolution (LTE)/LTE-A wireless communication network technology to provide communication between base stations 105.

Figure 10:
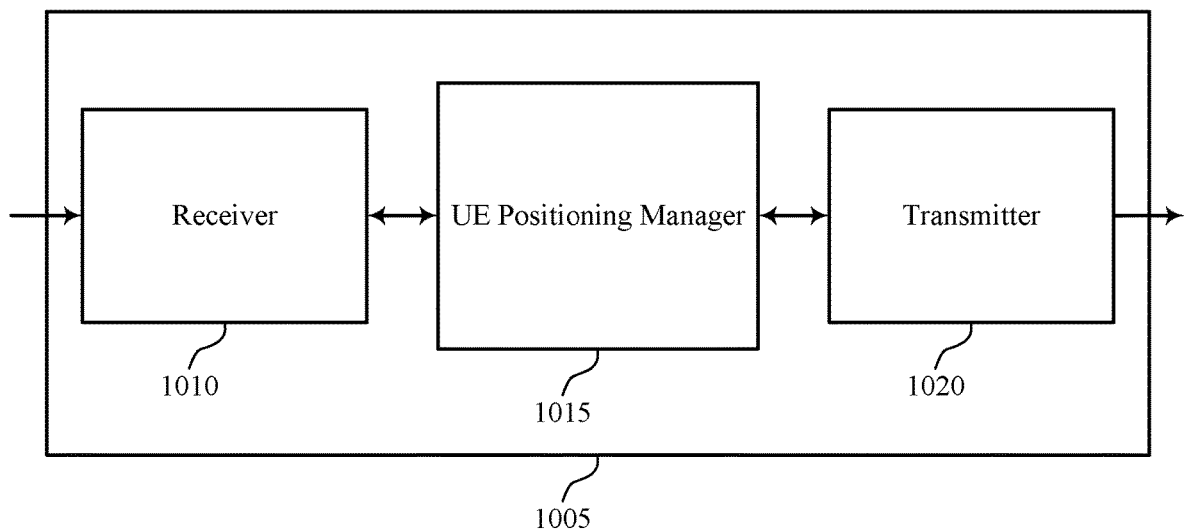
FIGS. 10 through 12 show block diagrams of a device in accordance with aspects of the present disclosure.

FIG. 10 shows a block diagram 1000 of a wireless device 1005 that supports positioning techniques for wireless communications devices using shared radio frequency spectrum in accordance with various aspects of the present disclosure. Wireless device 1005 may be an example of aspects of a UE 115 as described with reference to FIG. 1. Wireless device 1005 may include receiver 1010, UE positioning manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to positioning techniques for wireless communications devices using shared radio frequency spectrum, etc.). Information may be passed on to other components of the device. The receiver 1010 may be an example of aspects of the transceiver 1335 described with reference to FIG. 13.

UE positioning manager 1015 may be an example of aspects of the UE positioning manager 1315 described with reference to FIG. 13.

UE positioning manager 1015 and/or at least some of its various sub-components may be implemented in hardware, software executed by a processor, firmware, or any combination thereof. If implemented in software executed by a processor, the functions of the UE positioning manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE positioning manager 1015 and/or at least some of its various sub-components may be physically located at various positions, including being distributed such that portions of functions are implemented at different physical locations by one or more physical devices. In some examples, UE positioning manager 1015 and/or at least some of its various sub-components may be a separate and distinct component in accordance with various aspects of the present disclosure. In other examples, UE positioning manager 1015 and/or at least some of its various sub-components may be combined with one or more other hardware components, including but not limited to a receiver, a transmitter, a transceiver, one or more other components described in the present disclosure, or a combination thereof in accordance with various aspects of the present disclosure.

UE positioning manager 1015 may receive one or more parameters for performing a positioning procedure to determine a position of the UE while operating using frequency hopping in a shared radio frequency spectrum band and perform the positioning procedure, based on the one or more parameters.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may include a single antenna, or it may include a set of antennas.

Figure 11:
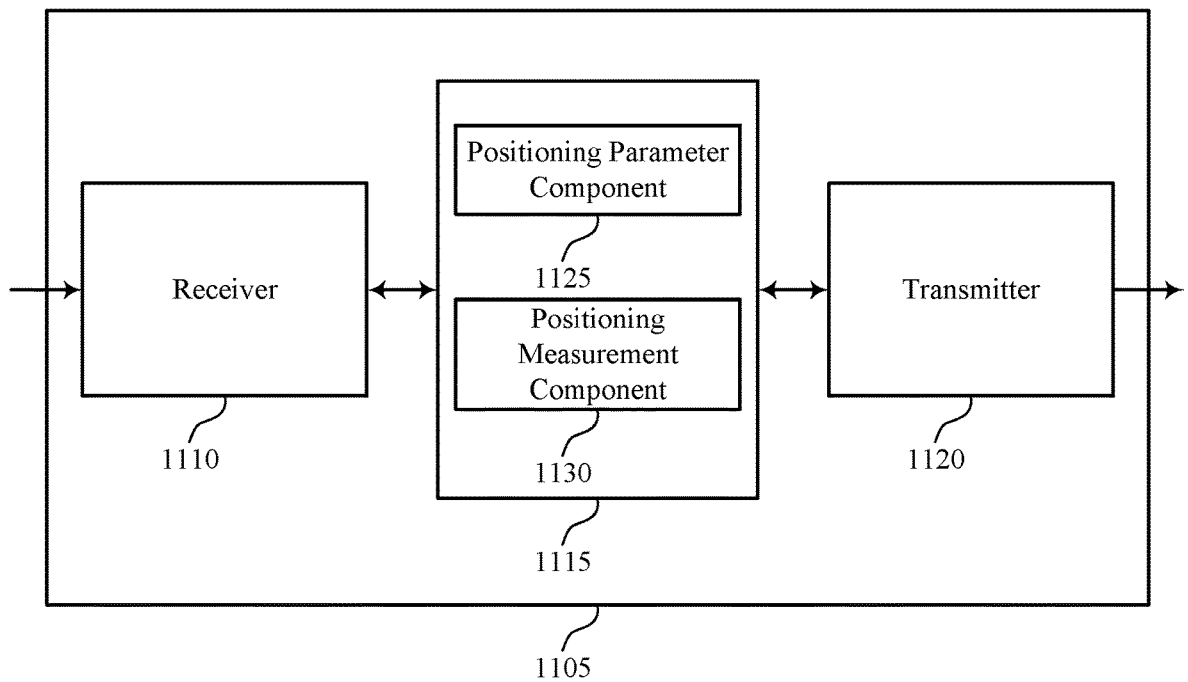

FIG. 11 shows a block diagram 1100 of a wireless device 1105 that supports positioning techniques for wireless communications devices using shared radio frequency spectrum in accordance with various aspects of the present disclosure. Wireless device 1105 may be an example of aspects of a wireless device 1005 or a UE 115 as described with reference to FIGS. 1 and 10. Wireless device 1105 may include receiver 1110, UE positioning manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to positioning techniques for wireless communications devices using shared radio frequency spectrum, etc.). Information may be passed on to other components of the device. The receiver 1110 may be an example of aspects of the transceiver 1335 described with reference to FIG. 13.

UE positioning manager 1115 may be an example of aspects of the UE positioning manager 1315 described with reference to FIG. 13. UE positioning manager 1115 may also include positioning parameter component 1125 and positioning measurement component 1130.

Positioning parameter component 1125 may receive one or more parameters for performing a positioning procedure to determine a position of the UE while operating using frequency hopping in a shared radio frequency spectrum band. In some cases, the positioning parameter component 1125 may determine, based on the one or more parameters, a fixed or floating frame alignment for a serving base station and one or more neighboring base stations. In some cases, the one or more parameters include information for detecting transmissions of a serving base station and one or more neighboring base stations. In some cases, the one or more parameters include one or more of a number of frames or subframes to monitor for a positioning reference signal. In some cases, the one or more parameters include a maximum number of attempts to perform to identify a positioning reference signal from one or more neighboring base stations.

Positioning measurement component 1130 may perform the positioning procedure, based on the one or more parameters, transmit measurements associated with the PRS transmissions using the shared radio frequency spectrum band, and transmit, to a serving base station, one or more measurement reports generated from the positioning procedure. In some cases, the one or more measurement reports include OTDOA measurements associated with one or more PRSs from one or more of the serving base station and one or more neighboring base stations.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may include a single antenna, or it may include a set of antennas.

Figure 12:
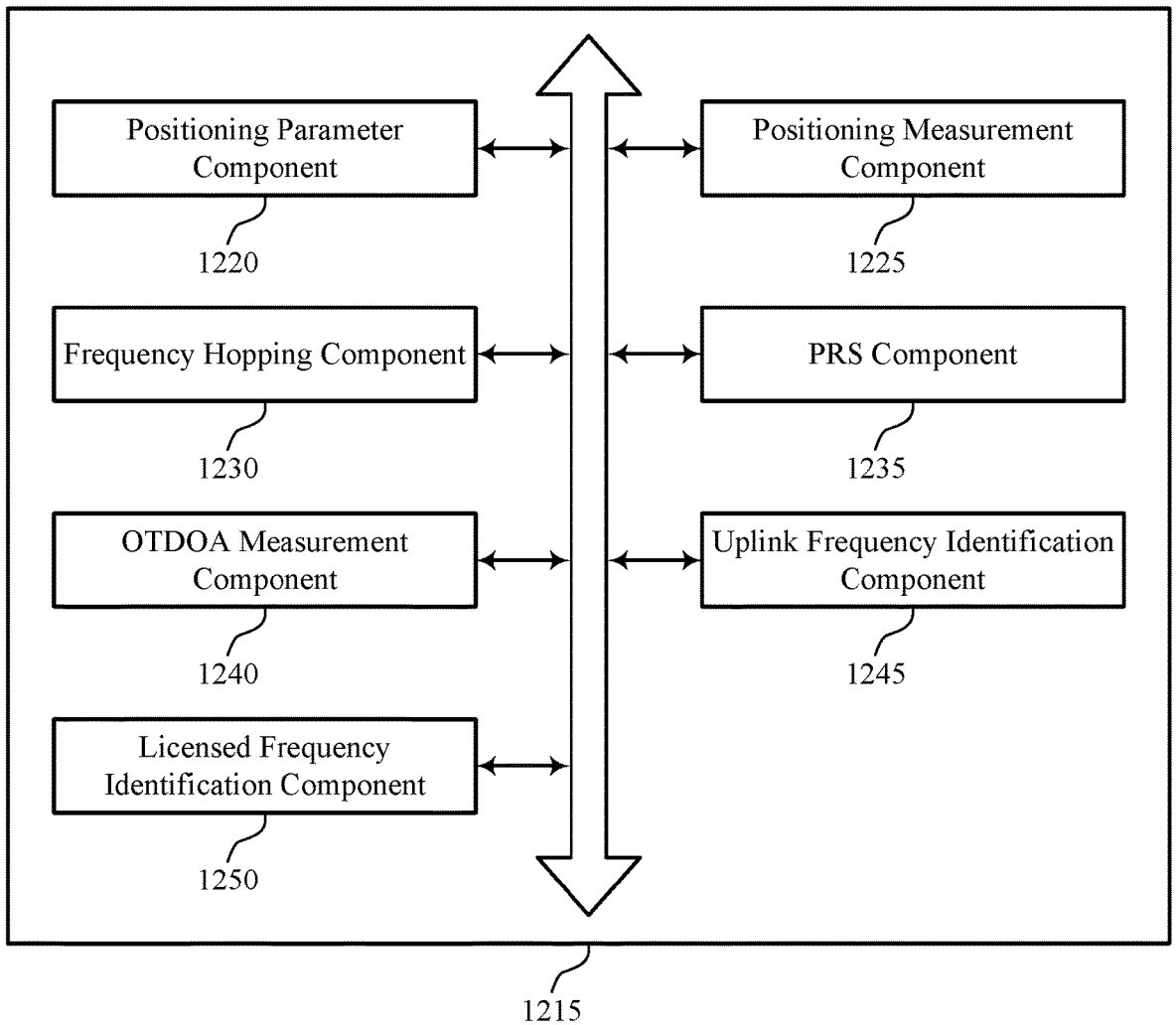

FIG. 12 shows a block diagram 1200 of a UE positioning manager 1215 that supports positioning techniques for wireless communications devices using shared radio frequency spectrum in accordance with various aspects of the present disclosure. The UE positioning manager 1215 may be an example of aspects of a UE positioning manager 1315 described with reference to FIGS. 10, 11, and 13. The UE positioning manager 1215 may include positioning parameter component 1220, positioning measurement component 1225, frequency hopping component 1230, PRS component 1235, OTDOA measurement component 1240, uplink frequency identification component 1245, and licensed frequency identification component 1250. Each of these modules may communicate, directly or indirectly, with one another (e.g., via one or more buses).

Positioning parameter component 1220 may receive one or more parameters for performing a positioning procedure to determine a position of the UE while operating using frequency hopping in a shared radio frequency spectrum band. In some cases, the positioning parameter component 1220 may determine, based on the one or more parameters, a fixed or floating frame alignment for a serving base station and one or more neighboring base stations. In some cases, the one or more parameters include information for detecting transmissions of a serving base station and one or more neighboring base stations. In some cases, the one or more parameters include one or more of a number of frames or subframes to monitor for a positioning reference signal. In some cases, the one or more parameters include a maximum number of attempts to perform to identify a positioning reference signal from one or more neighboring base stations.

Positioning measurement component 1225 may perform the positioning procedure, based on the one or more parameters, transmit measurements associated with the PRS transmissions using the shared radio frequency spectrum band, and transmit, to a serving base station, one or more measurement reports generated from the positioning procedure. In some cases, the one or more measurement reports include OTDOA measurements associated with one or more PRSs from one or more of the serving base station and one or more neighboring base stations.

Frequency hopping component 1230 may identify, based on the one or more parameters, a PRS frequency hopping pattern for a serving base station and one or more neighboring base stations.

PRS component 1235 may monitor for a PRS transmission from one or more of the serving base station or the one or more neighboring base stations based on the PRS frequency hopping pattern. In some cases, PRS component 1235 may transmit one or more uplink positioning transmissions to one or more of the serving base station or the one or more neighboring base stations using the identified frequencies. In some cases, PRS component 1235 may determine, based on the one or more parameters, a transmission time for each of a set of uplink positioning transmissions based on an estimated range between the UE and each of the serving base station and the one or more neighboring base stations. In some cases, PRS component 1235 may transmit each of the set of uplink positioning transmissions based on the determined transmission time for each of a set of uplink positioning transmissions. In some cases, PRS component 1235 may monitor one or more frequencies in the dedicated radio frequency spectrum band for the PRS transmissions. In some cases, the transmitting the one or more uplink positioning transmissions is performed in an absence of performance of a LBT procedure. In some cases, PRS component 1235 may monitor for a PRS transmission from one or more of the serving base station or the one or more neighboring base stations based on a fixed or floating frame alignment.

OTDOA measurement component 1240 may determine an OTDOA based on one or more identified PRS transmissions. Uplink frequency identification component 1245 may identify, based on the one or more parameters, a frequency for one or more uplink positioning transmissions to be transmitted from the UE to each of a serving base station and one or more neighboring base stations. Licensed frequency identification component 1250 may determine one or more frequencies in a dedicated radio frequency spectrum band for PRS transmissions of one or more base stations.

Figure 13:
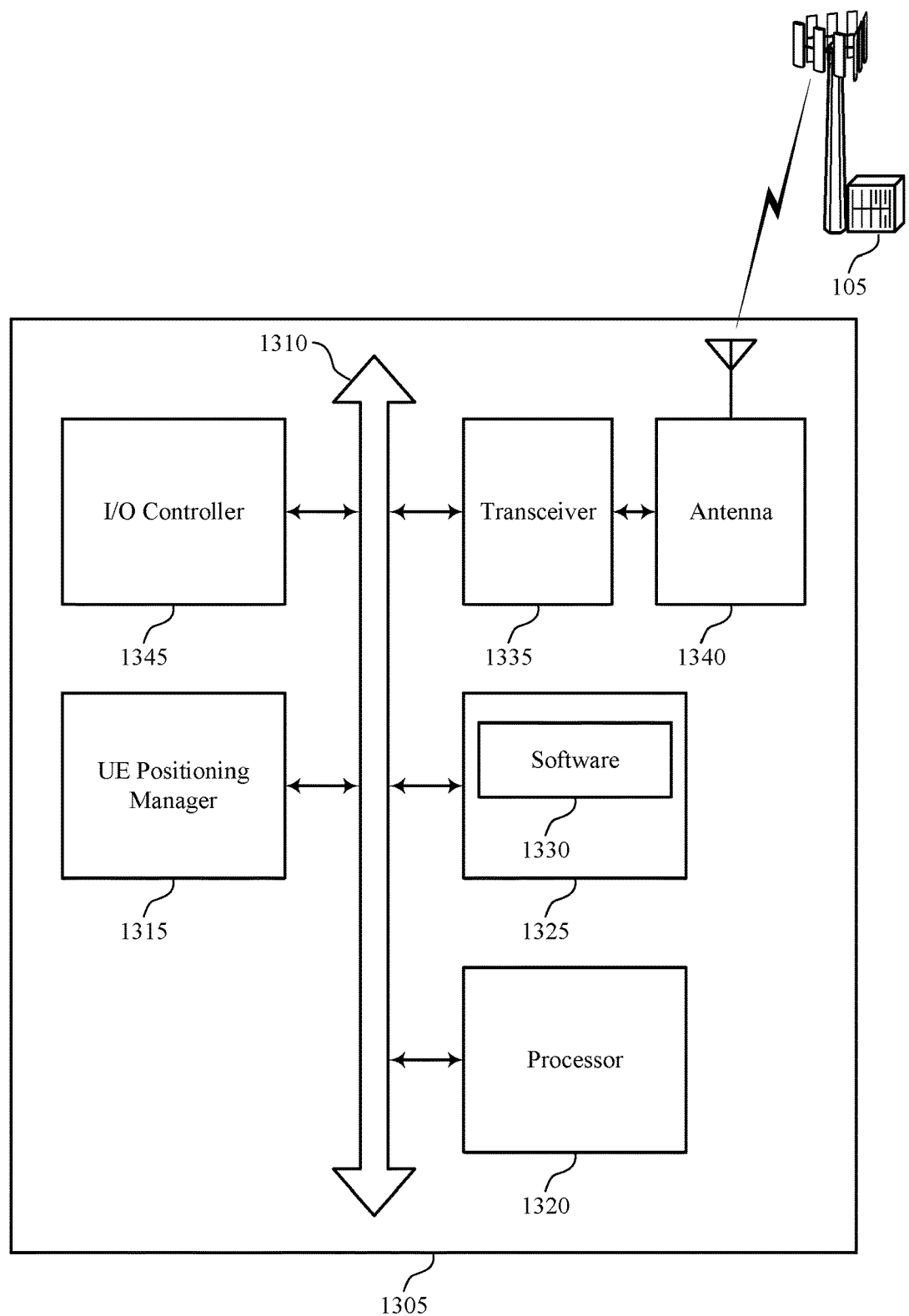
FIG. 13 illustrates a block diagram of a system including a UE in accordance with aspects of the present disclosure.

FIG. 13 shows a diagram of a system 1300 including a device 1305 that supports positioning techniques for wireless communications devices using shared radio frequency spectrum in accordance with various aspects of the present disclosure. Device 1305 may be an example of or include the components of UE 115 as described above (e.g., with reference to FIG. 1). Device 1305 may include components for bi-directional voice and data communications including components for transmitting and receiving communications, including UE positioning manager 1315, processor 1320, memory 1325, software 1330, transceiver 1335, antenna 1340, and I/O controller 1345. These components may be in electronic communication via one or more busses (e.g., bus 1310). Device 1305 may communicate wirelessly with one or more base stations 105.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting positioning techniques for wireless communications devices using shared radio frequency spectrum).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware and/or software operation such as the interaction with peripheral components or devices.

Software 1330 may include code to implement aspects of the present disclosure, including code to support positioning techniques for wireless communications devices using shared radio frequency spectrum. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

I/O controller 1345 may manage input and output signals for device 1305. I/O controller 1345 may also manage peripherals not integrated into device 1305. In some cases, I/O controller 1345 may represent a physical connection or port to an external peripheral. In some cases, I/O controller 1345 may utilize an operating system such as iOS®, ANDROID®, MS-DOS®, MS-WINDOWS®, OS/2®, UNIX®, LINUX®, or another known operating system.

Figure 14:
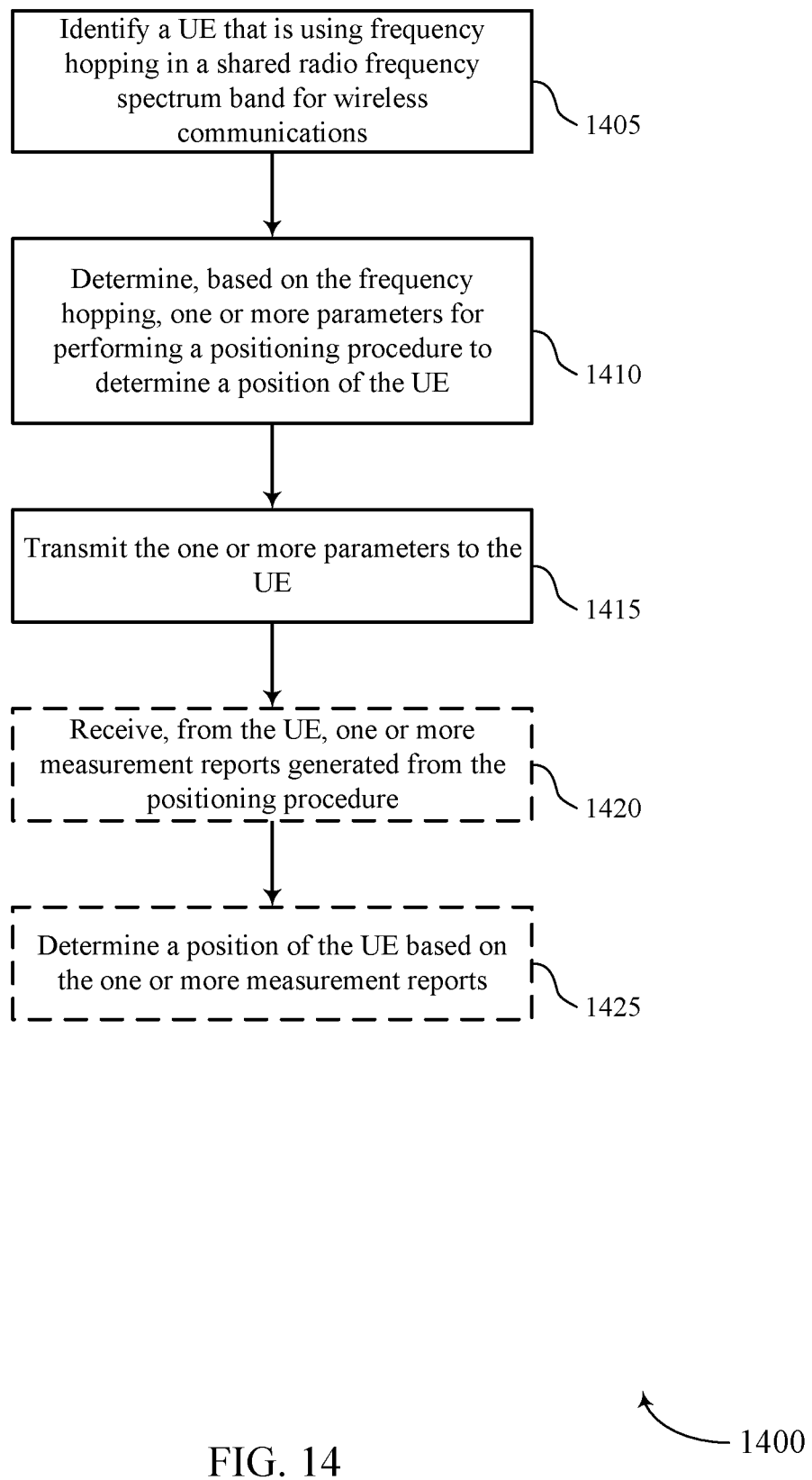
FIGS. 14 through 21 illustrate methods in accordance with aspects of the present disclosure.

FIG. 14 shows a flowchart illustrating a method 1400 for positioning techniques for wireless communications devices using shared radio frequency spectrum in accordance with various aspects of the present disclosure. The operations of method 1400 may be implemented by a base station 105 or its components as described herein. For example, the operations of method 1400 may be performed by a base station positioning manager as described with reference to FIGS. 6 through 9. In some examples, a base station 105 may execute a set of codes to control the functional elements of the device to perform the functions described below. Additionally or alternatively, the base station 105 may perform aspects of the functions described below using special-purpose hardware.

At block 1405 the base station 105 may identify a UE that is using frequency hopping in a shared radio frequency spectrum band for wireless communications. The operations of block 1405 may be performed according to the methods described with reference to FIGS. 1 through 5. In certain examples, aspects of the operations of block 1405 may be performed by a UE identification component as described with reference to FIGS. 6 through 9.

At block 1410 the base station 105 may determine, based at least in part on the frequency hopping, one or more parameters for performing a positioning procedure to determine a position of the UE. The operations of block 1410 may be performed according to the methods described with reference to FIGS. 1 through 5. In certain examples, aspects of the operations of block 1410 may be performed by a positioning parameter component as described with reference to FIGS. 6 through 9.

At block 1415 the base station 105 may transmit the one or more parameters to the UE. The operations of block 1415 may be performed according to the methods described with reference to FIGS. 1 through 5. In certain examples, aspects of the operations of block 1415 may be performed by a transmitter as described with reference to FIGS. 6 through 9.

At optional block 1420 the base station 105 may receive, from the UE, one or more measurement reports generated from the positioning procedure. The operations of block 1420 may be performed according to the methods described with reference to FIGS. 1 through 5. In certain examples, aspects of the operations of block 1420 may be performed by a measurement report component as described with reference to FIGS. 6 through 9.

At optional block 1425 the base station 105 may determine a position of the UE based at least in part on the one or more measurement reports. The operations of block 1425 may be performed according to the methods described with reference to FIGS. 1 through 5. In certain examples, aspects of the operations of block 1425 may be performed by a position determination component as described with reference to FIGS. 6 through 9. In some cases, the base station may communicate with a positioning server that may determine the position of the UE.

Figure 15:
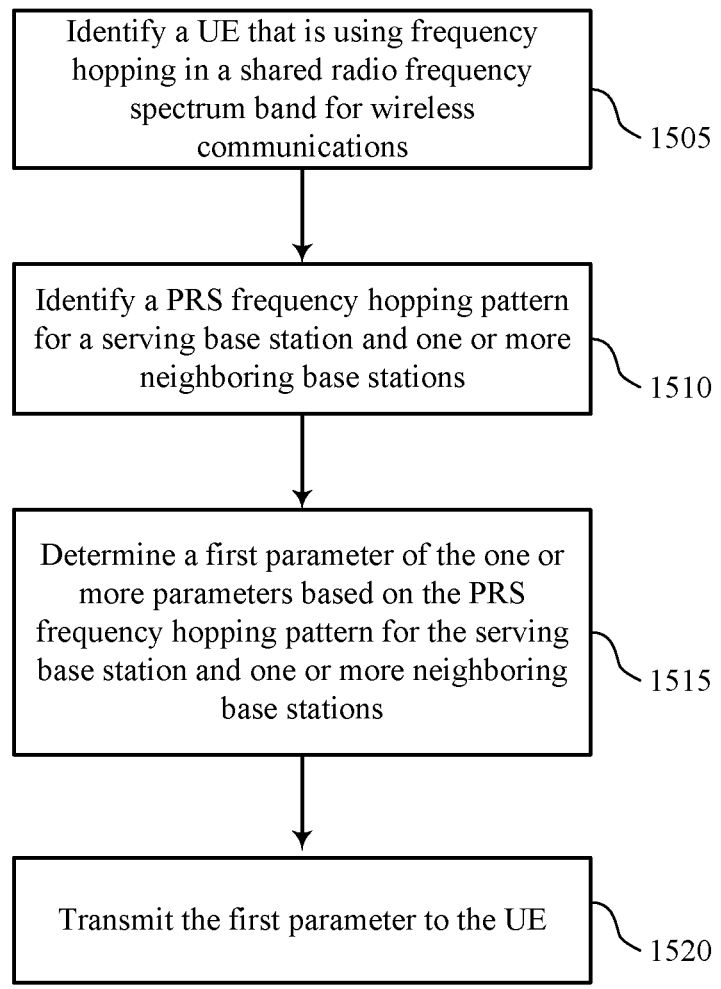

FIG. 15 shows a flowchart illustrating a method 1500 for positioning techniques for wireless communications devices using shared radio frequency spectrum in accordance with various aspects of the present disclosure. The operations of method 1500 may be implemented by a base station 105 or its components as described herein. For example, the operations of method 1500 may be performed by a base station positioning manager as described with reference to FIGS. 6 through 9. In some examples, a base station 105 may execute a set of codes to control the functional elements of the device to perform the functions described below. Additionally or alternatively, the base station 105 may perform aspects of the functions described below using special-purpose hardware.

At block 1505 the base station 105 may identify a UE that is using frequency hopping in a shared radio frequency spectrum band for wireless communications. The operations of block 1505 may be performed according to the methods described with reference to FIGS. 1 through 5. In certain examples, aspects of the operations of block 1505 may be performed by a UE identification component as described with reference to FIGS. 6 through 9.

At block 1510 the base station 105 may identify a PRS frequency hopping pattern for a serving base station and one or more neighboring base stations. The operations of block 1510 may be performed according to the methods described with reference to FIGS. 1 through 5. In certain examples, aspects of the operations of block 1510 may be performed by a frequency hopping component as described with reference to FIGS. 6 through 9.

At block 1515 the base station 105 may determine a first parameter of the one or more parameters based at least in part on the PRS frequency hopping pattern for the serving base station and one or more neighboring base stations. The operations of block 1515 may be performed according to the methods described with reference to FIGS. 1 through 5. In certain examples, aspects of the operations of block 1515 may be performed by a positioning parameter component as described with reference to FIGS. 6 through 9.

At block 1520 the base station 105 may transmit the one or more parameters to the UE. The operations of block 1520 may be performed according to the methods described with reference to FIGS. 1 through 5. In certain examples, aspects of the operations of block 1520 may be performed by a transmitter as described with reference to FIGS. 6 through 9.

Figure 16:
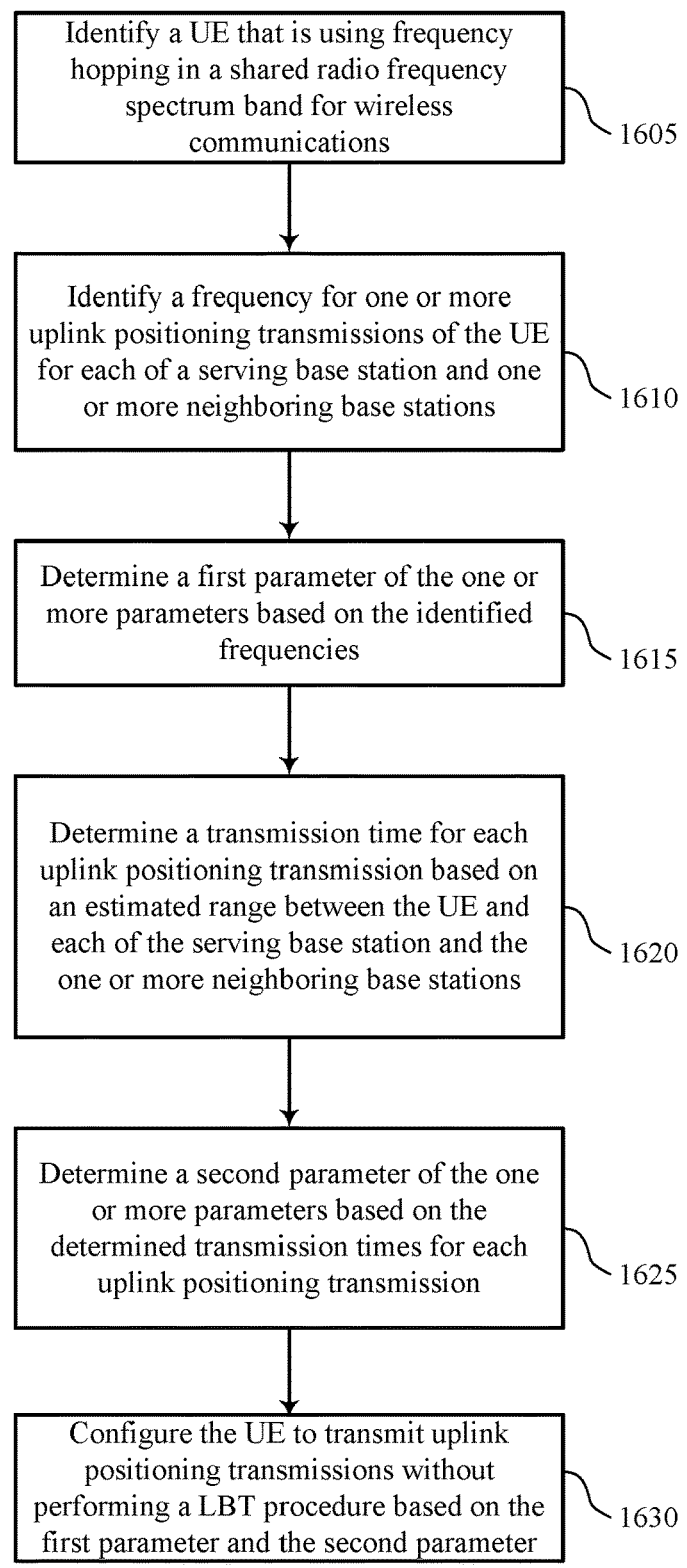

FIG. 16 shows a flowchart illustrating a method 1600 for positioning techniques for wireless communications devices using shared radio frequency spectrum in accordance with various aspects of the present disclosure. The operations of method 1600 may be implemented by a base station 105 or its components as described herein. For example, the operations of method 1600 may be performed by a base station positioning manager as described with reference to FIGS. 6 through 9. In some examples, a base station 105 may execute a set of codes to control the functional elements of the device to perform the functions described below. Additionally or alternatively, the base station 105 may perform aspects of the functions described below using special-purpose hardware.

At block 1605 the base station 105 may identify a UE that is using frequency hopping in a shared radio frequency spectrum band for wireless communications. The operations of block 1605 may be performed according to the methods described with reference to FIGS. 1 through 5. In certain examples, aspects of the operations of block 1605 may be performed by a UE identification component as described with reference to FIGS. 6 through 9.

At block 1610 the base station 105 may identify a frequency for one or more uplink positioning transmissions of the UE for each of a serving base station and one or more neighboring base stations. The operations of block 1610 may be performed according to the methods described with reference to FIGS. 1 through 5. In certain examples, aspects of the operations of block 1610 may be performed by a uplink frequency identification component as described with reference to FIGS. 6 through 9.

At block 1615 the base station 105 may determine a first parameter of the one or more parameters based at least in part on the identified frequencies. The operations of block 1615 may be performed according to the methods described with reference to FIGS. 1 through 5. In certain examples, aspects of the operations of block 1615 may be performed by a positioning parameter component as described with reference to FIGS. 6 through 9.

At block 1620 the base station 105 may determine a transmission time for each uplink positioning transmission based at least in part on an estimated range between the UE and each of the serving base station and the one or more neighboring base stations. The operations of block 1620 may be performed according to the methods described with reference to FIGS. 1 through 5. In certain examples, aspects of the operations of block 1620 may be performed by a uplink transmission time component as described with reference to FIGS. 6 through 9.

At block 1625 the base station 105 may determine a second parameter of the one or more parameters based at least in part on the determined transmission times for each uplink positioning transmission. The operations of block 1625 may be performed according to the methods described with reference to FIGS. 1 through 5. In certain examples, aspects of the operations of block 1625 may be performed by a positioning parameter component as described with reference to FIGS. 6 through 9.

At block 1630 the base station 105 may configure the UE to transmit the one or more uplink positioning transmissions without performing a LBT procedure based on the first parameter and the second parameter. The operations of block 1630 may be performed according to the methods described with reference to FIGS. 1 through 5. In certain examples, aspects of the operations of block 1630 may be performed by a UE configuration component as described with reference to FIGS. 6 through 9.

Figure 17:
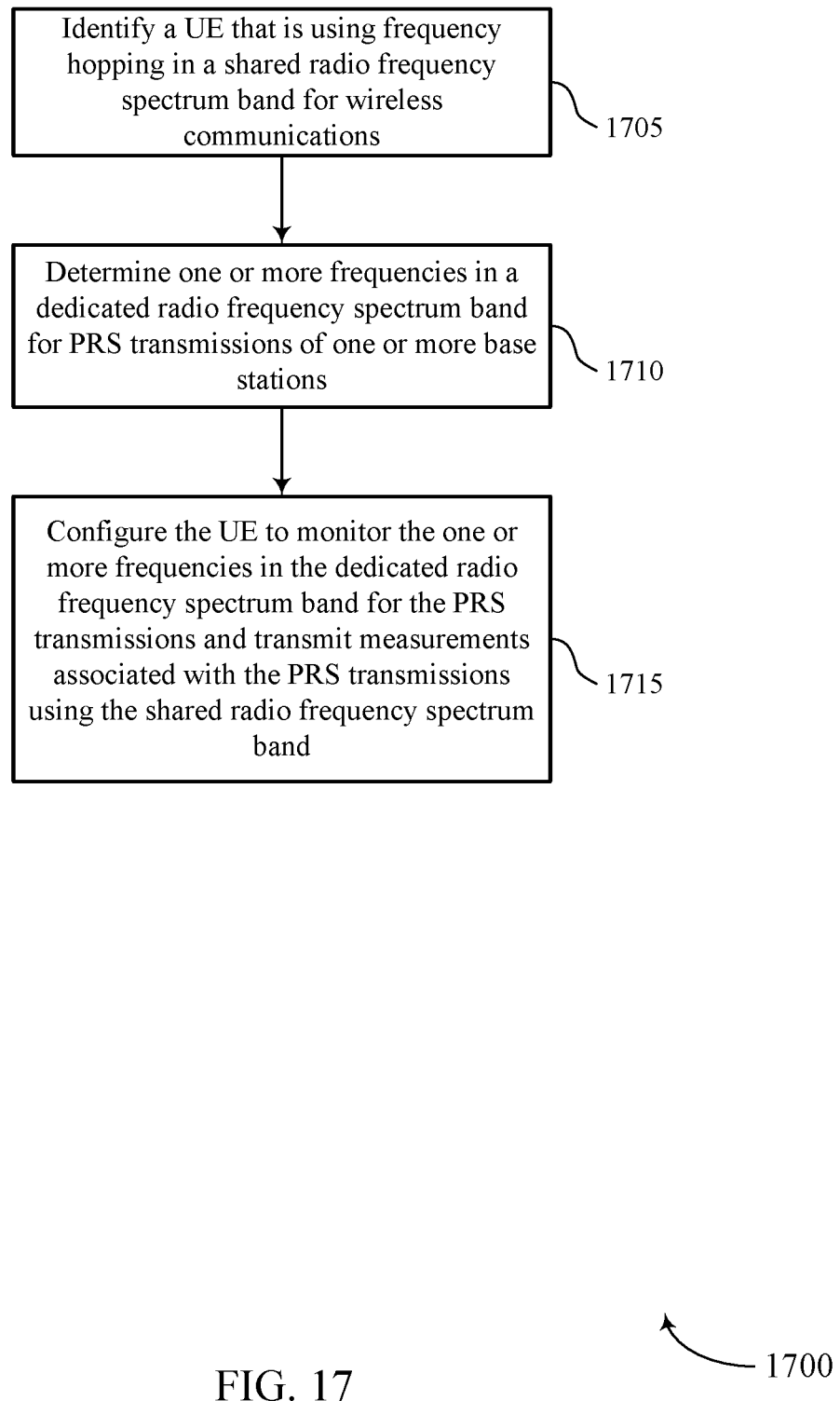

FIG. 17 shows a flowchart illustrating a method 1700 for positioning techniques for wireless communications devices using shared radio frequency spectrum in accordance with various aspects of the present disclosure. The operations of method 1700 may be implemented by a base station 105 or its components as described herein. For example, the operations of method 1700 may be performed by a base station positioning manager as described with reference to FIGS. 6 through 9. In some examples, a base station 105 may execute a set of codes to control the functional elements of the device to perform the functions described below. Additionally or alternatively, the base station 105 may perform aspects of the functions described below using special-purpose hardware.

At block 1705 the base station 105 may identify a UE that is using frequency hopping in a shared radio frequency spectrum band for wireless communications. The operations of block 1705 may be performed according to the methods described with reference to FIGS. 1 through 5. In certain examples, aspects of the operations of block 1705 may be performed by a UE identification component as described with reference to FIGS. 6 through 9.

At block 1710 the base station 105 may determine one or more frequencies in a dedicated radio frequency spectrum band for PRS transmissions of one or more base stations. The operations of block 1710 may be performed according to the methods described with reference to FIGS. 1 through 5. In certain examples, aspects of the operations of block 1710 may be performed by a licensed frequency identification component as described with reference to FIGS. 6 through 9.

At block 1715 the base station 105 may configure the UE to monitor the one or more frequencies in the dedicated radio frequency spectrum band for the PRS transmissions and transmit measurements associated with the PRS transmissions using the shared radio frequency spectrum band. The operations of block 1715 may be performed according to the methods described with reference to FIGS. 1 through 5. In certain examples, aspects of the operations of block 1715 may be performed by a UE configuration component as described with reference to FIGS. 6 through 9.

Figure 18:
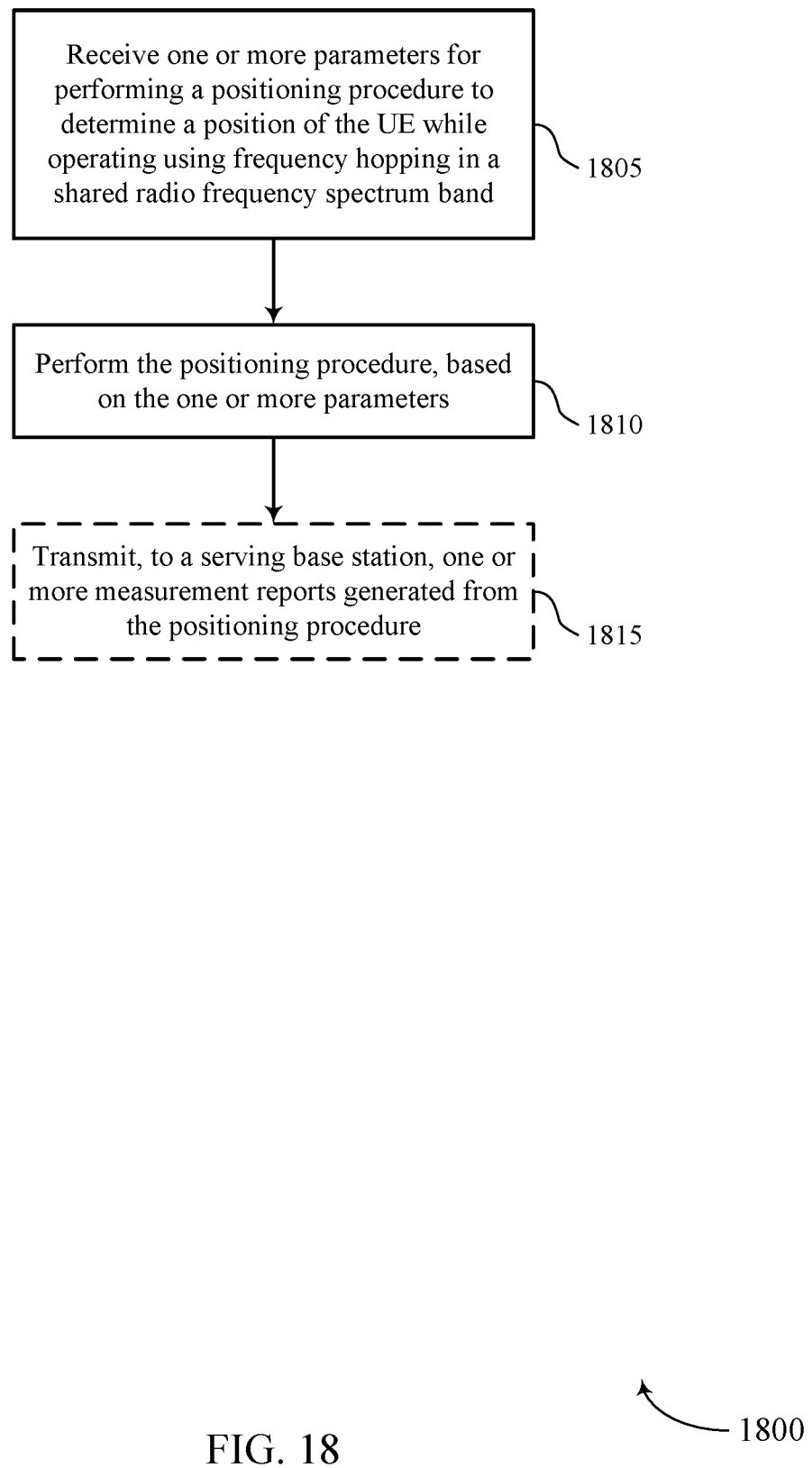

FIG. 18 shows a flowchart illustrating a method 1800 for positioning techniques for wireless communications devices using shared radio frequency spectrum in accordance with various aspects of the present disclosure. The operations of method 1800 may be implemented by a UE 115 or its components as described herein. For example, the operations of method 1800 may be performed by a UE positioning manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At block 1805 the UE 115 may receive one or more parameters for performing a positioning procedure to determine a position of the UE while operating using frequency hopping in a shared radio frequency spectrum band. The operations of block 1805 may be performed according to the methods described with reference to FIGS. 1 through 5. In certain examples, aspects of the operations of block 1805 may be performed by a positioning parameter component as described with reference to FIGS. 10 through 13.

At block 1810 the UE 115 may perform the positioning procedure, based at least in part on the one or more parameters. The operations of block 1810 may be performed according to the methods described with reference to FIGS. 1 through 5. In certain examples, aspects of the operations of block 1810 may be performed by a positioning measurement component as described with reference to FIGS. 10 through 13.

At optional block 1815 the UE 115 may transmit, to a serving base station, one or more measurement reports generated from the positioning procedure. The operations of block 1815 may be performed according to the methods described with reference to FIGS. 1 through 5. In certain examples, aspects of the operations of block 1815 may be performed by a positioning measurement component as described with reference to FIGS. 10 through 13.

Figure 19:
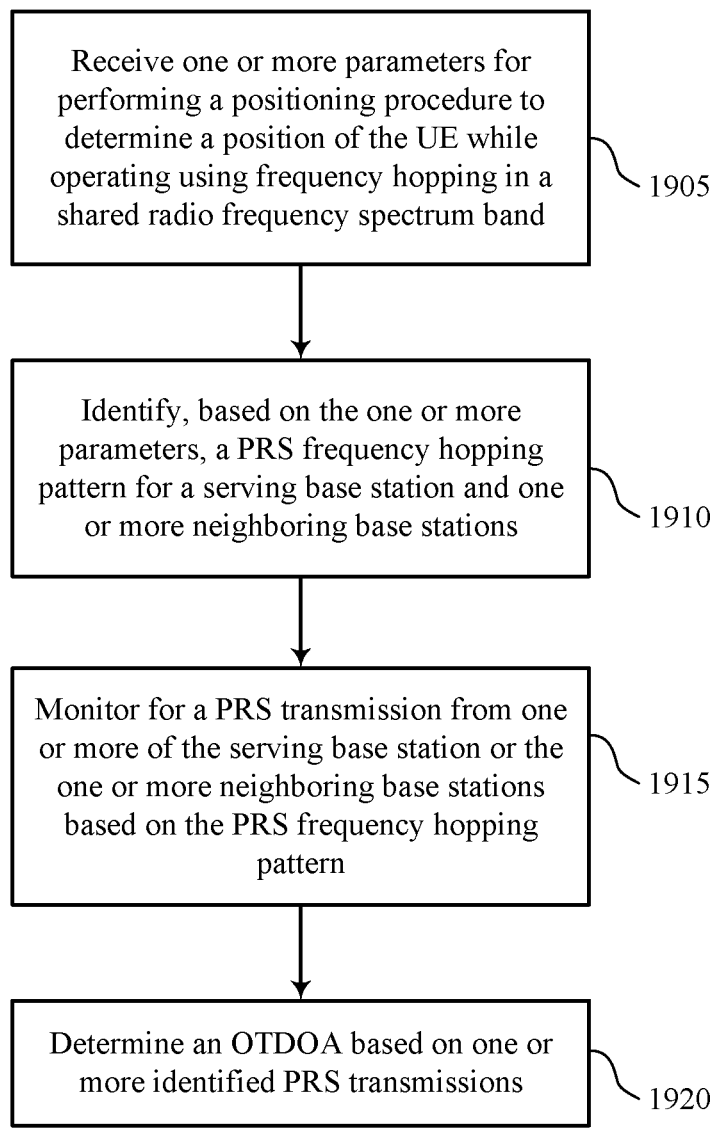

FIG. 19 shows a flowchart illustrating a method 1900 for positioning techniques for wireless communications devices using shared radio frequency spectrum in accordance with various aspects of the present disclosure. The operations of method 1900 may be implemented by a UE 115 or its components as described herein. For example, the operations of method 1900 may be performed by a UE positioning manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At block 1905 the UE 115 may receive one or more parameters for performing a positioning procedure to determine a position of the UE while operating using frequency hopping in a shared radio frequency spectrum band. The operations of block 1905 may be performed according to the methods described with reference to FIGS. 1 through 5. In certain examples, aspects of the operations of block 1905 may be performed by a positioning parameter component as described with reference to FIGS. 10 through 13.

At block 1910 the UE 115 may identify, based at least in part on the one or more parameters, a PRS frequency hopping pattern for a serving base station and one or more neighboring base stations. The operations of block 1910 may be performed according to the methods described with reference to FIGS. 1 through 5. In certain examples, aspects of the operations of block 1910 may be performed by a frequency hopping component as described with reference to FIGS. 10 through 13.

At block 1915 the UE 115 may monitor for a PRS transmission from one or more of the serving base station or the one or more neighboring base stations based at least in part on the PRS frequency hopping pattern. The operations of block 1915 may be performed according to the methods described with reference to FIGS. 1 through 5. In certain examples, aspects of the operations of block 1915 may be performed by a PRS component as described with reference to FIGS. 10 through 13.

At block 1920 the UE 115 may determine an OTDOA based at least in part on one or more identified PRS transmissions. The operations of block 1920 may be performed according to the methods described with reference to FIGS. 1 through 5. In certain examples, aspects of the operations of block 1920 may be performed by a OTDOA measurement component as described with reference to FIGS. 10 through 13.

Figure 20:
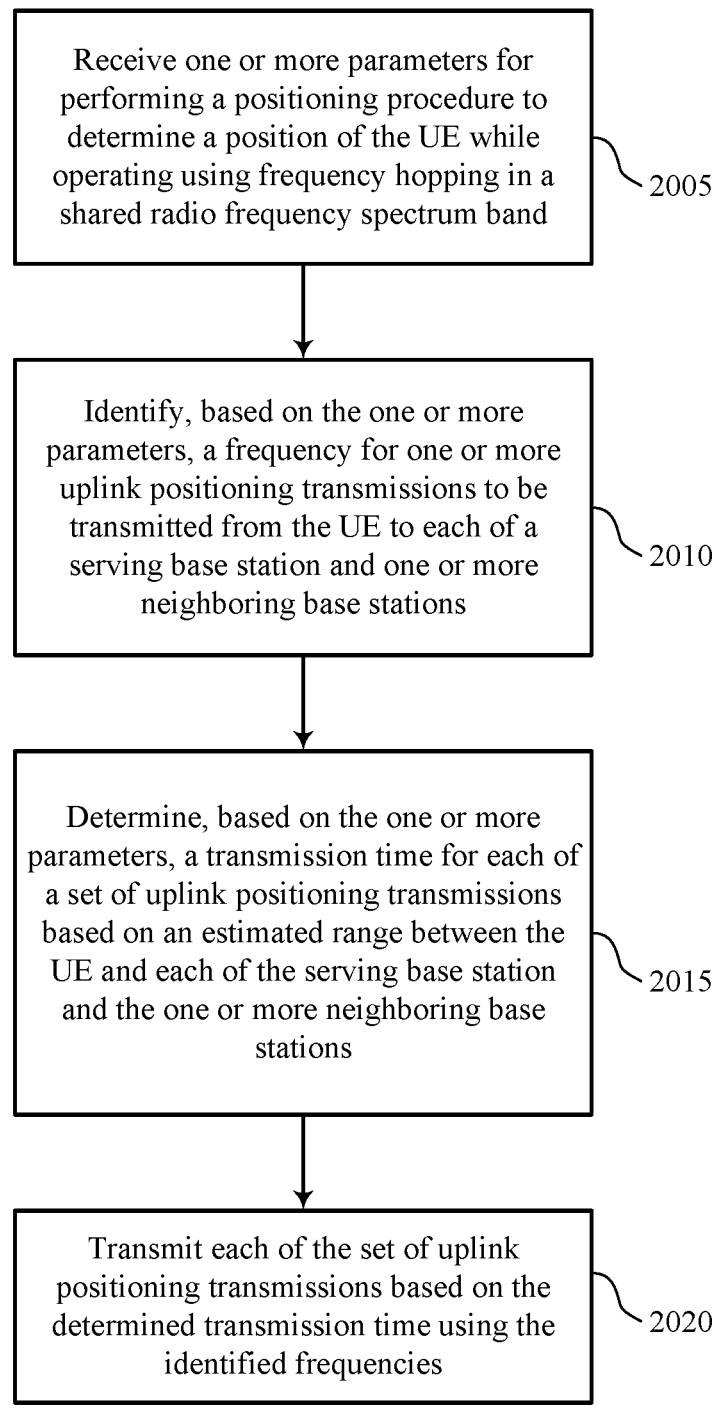

FIG. 20 shows a flowchart illustrating a method 2000 for positioning techniques for wireless communications devices using shared radio frequency spectrum in accordance with various aspects of the present disclosure. The operations of method 2000 may be implemented by a UE 115 or its components as described herein. For example, the operations of method 2000 may be performed by a UE positioning manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At block 2005 the UE 115 may receive one or more parameters for performing a positioning procedure to determine a position of the UE while operating using frequency hopping in a shared radio frequency spectrum band. The operations of block 2005 may be performed according to the methods described with reference to FIGS. 1 through 5. In certain examples, aspects of the operations of block 2005 may be performed by a positioning parameter component as described with reference to FIGS. 10 through 13.

At block 2010 the UE 115 may identify, based at least in part on the one or more parameters, a frequency for one or more uplink positioning transmissions to be transmitted from the UE to each of a serving base station and one or more neighboring base stations. The operations of block 2010 may be performed according to the methods described with reference to FIGS. 1 through 5. In certain examples, aspects of the operations of block 2010 may be performed by a uplink frequency identification component as described with reference to FIGS. 10 through 13.

At block 2015 the UE 115 may determine, based at least in part on the one or more parameters, a transmission time for each of a set of uplink positioning transmissions based at least in part on an estimated range between the UE and each of the serving base station and the one or more neighboring base stations. The operations of block 2015 may be performed according to the methods described with reference to FIGS. 1 through 5. In certain examples, aspects of the operations of block 2015 may be performed by a PRS component as described with reference to FIGS. 10 through 13.

At block 2020 the UE 115 may transmit each of the set of uplink positioning transmissions based at least in part on the determined transmission time for each of a plurality of uplink positioning transmissions. The operations of block 2020 may be performed according to the methods described with reference to FIGS. 1 through 5. In certain examples, aspects of the operations of block 2020 may be performed by a PRS component as described with reference to FIGS. 10 through 13.

Figure 21:
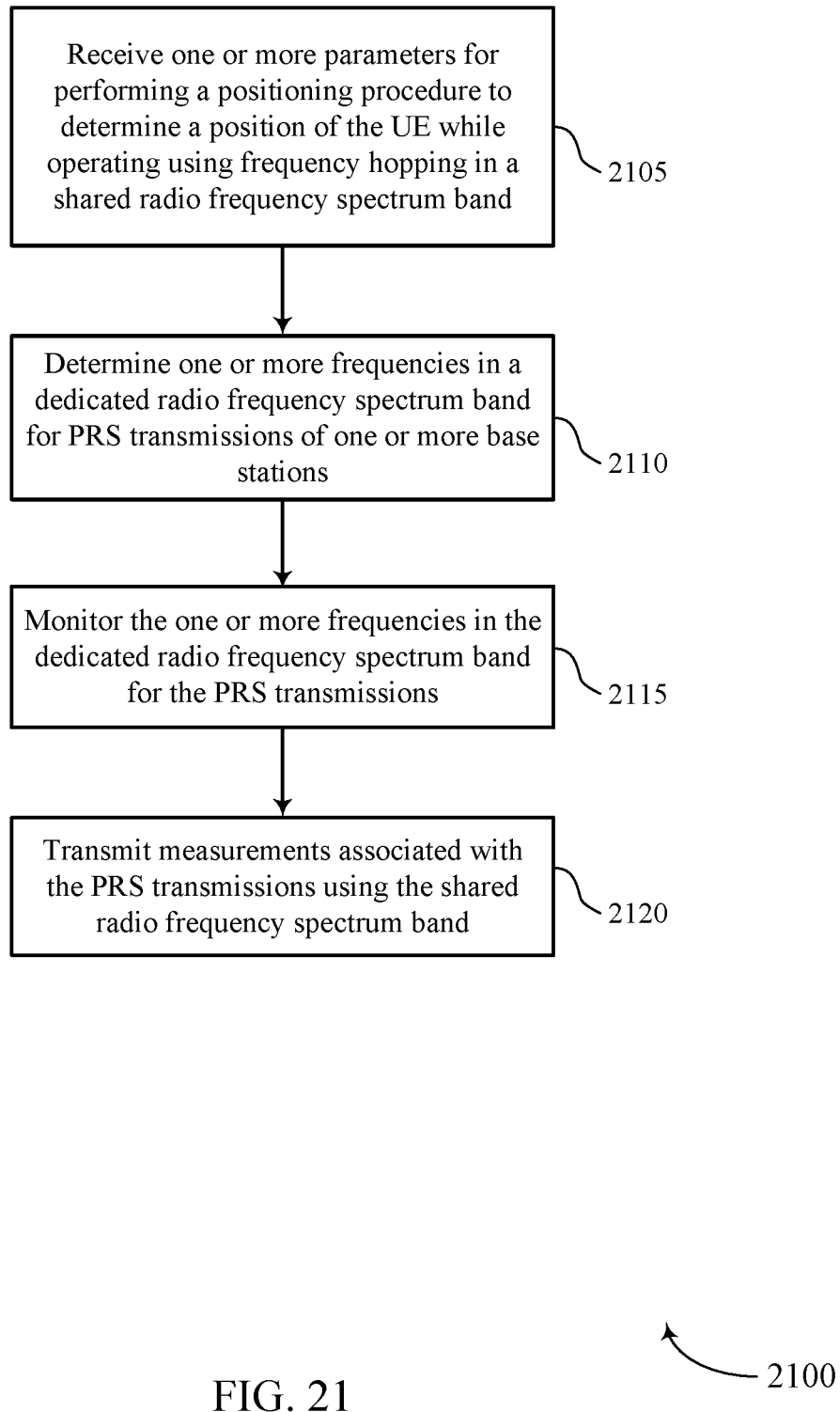

FIG. 21 shows a flowchart illustrating a method 2100 for positioning techniques for wireless communications devices using shared radio frequency spectrum in accordance with various aspects of the present disclosure. The operations of method 2100 may be implemented by a UE 115 or its components as described herein. For example, the operations of method 2100 may be performed by a UE positioning manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At block 2105 the UE 115 may receive one or more parameters for performing a positioning procedure to determine a position of the UE while operating using frequency hopping in a shared radio frequency spectrum band. The operations of block 2105 may be performed according to the methods described with reference to FIGS. 1 through 5. In certain examples, aspects of the operations of block 2105 may be performed by a positioning parameter component as described with reference to FIGS. 10 through 13.

At block 2110 the UE 115 may determine one or more frequencies in a dedicated radio frequency spectrum band for PRS transmissions of one or more base stations. The operations of block 2110 may be performed according to the methods described with reference to FIGS. 1 through 5. In certain examples, aspects of the operations of block 2110 may be performed by a licensed frequency identification component as described with reference to FIGS. 10 through 13.

At block 2115 the UE 115 may monitor the one or more frequencies in the dedicated radio frequency spectrum band for the PRS transmissions. The operations of block 2115 may be performed according to the methods described with reference to FIGS. 1 through 5. In certain examples, aspects of the operations of block 2115 may be performed by a PRS component as described with reference to FIGS. 10 through 13.

At block 2120 the UE 115 may transmit measurements associated with the PRS transmissions using the shared radio frequency spectrum band. The operations of block 2120 may be performed according to the methods described with reference to FIGS. 1 through 5. In certain examples, aspects of the operations of block 2120 may be performed by a positioning measurement component as described with reference to FIGS. 10 through 13.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a serving base station, comprising:
identifying a user equipment (UE) that is using frequency hopping in a shared radio frequency spectrum band for wireless communications;
determining, based at least in part on the frequency hopping, one or more parameters for performing a positioning procedure to determine a position of the UE, wherein the one or more parameters indicate a first positioning reference signal (PRS) frequency hopping pattern for the serving base station and a second PRS frequency hopping pattern for one or more neighboring base stations for the UE to perform PRS transmission detection for the serving base station and for the one or more neighboring base stations; and
transmitting the one or more parameters to the UE.

2. The method of claim 1, wherein transmitting the one or more parameters further comprises:
transmitting the one or more parameters that indicate a first number of frames or subframes to monitor for a first PRS transmission from the serving base station in accordance with the first PRS frequency hopping pattern and indicate a second number of frames or subframes to monitor for a second PRS transmission from the serving base station in accordance with the second PRS frequency hopping pattern.

3. The method of claim 1, wherein the one or more parameters include information for the UE to perform the transmission detection for the serving base station and the one or more neighboring base stations based at least in part on the frequency hopping.

4. The method of claim 1, further comprising:
identifying a frequency for one or more uplink positioning transmissions of the UE for each of the serving base station and the one or more neighboring base stations; and
determining a first parameter of the one or more parameters based at least in part on the identified frequency.

5. The method of claim 4, further comprising:
configuring the UE to transmit the one or more uplink positioning transmissions without performing a listen-before-talk (LBT) procedure.

6. The method of claim 4, further comprising:
determining a transmission time for each uplink positioning transmission based at least in part on an estimated range between the UE and each of the serving base station and the one or more neighboring base stations; and
determining a second parameter of the one or more parameters based at least in part on the determined transmission times.

7. The method of claim 1, further comprising:
determining one or more frequencies in a dedicated radio frequency spectrum band for PRS transmissions of one or more base stations;
configuring the UE to monitor the one or more frequencies in the dedicated radio frequency spectrum band for the PRS transmissions and transmit measurements associated with the PRS transmissions using the shared radio frequency spectrum band.

8. The method of claim 1, further comprising:
determining a fixed or floating frame alignment for the serving base station and the one or more neighboring base stations; and
determining a first parameter of the one or more parameters based at least in part on the fixed or floating frame alignment for one or more of the serving base station or the one or more neighboring base stations.

9. The method of claim 1, wherein the one or more parameters include one or more of a number of frames or subframes that the UE is to monitor for a positioning reference signal.

10. The method of claim 1, wherein the one or more parameters include a maximum number of attempts that the UE is to perform to identify a positioning reference signal from the one or more neighboring base stations.

11. The method of claim 1, further comprising:
receiving, from the UE, one or more measurement reports indicating a first measurement generated in accordance with the first PRS frequency hopping pattern and a second measurement generated in accordance with the second PRS frequency hopping pattern; and
determining the position of the UE based at least in part on the one or more measurement reports.

12. The method of claim 11, wherein the one or more measurement reports include observed time different of arrival (OTDOA) measurements associated with one or more PRSs from one or more of the serving base station and the one or more neighboring base stations.

13. The method of claim 1, further comprising:
transmitting a first PRS transmission and a second PRS transmission to the UE, wherein the first PRS transmission provides increased coverage relative to the second PRS transmission.

14. A method for wireless communication, comprising:
receiving, at a user equipment (UE), one or more parameters for performing a positioning procedure to determine a position of the UE while operating using frequency hopping in a shared radio frequency spectrum band, wherein the one or more parameters indicate a first positioning reference signal (PRS) frequency hopping pattern for a serving base station and a second PRS frequency hopping pattern for one or more neighboring base stations for the UE to perform PRS transmission detection for the serving base station and for the one or more neighboring base stations; and
performing the positioning procedure, based at least in part on the one or more parameters.

15. The method of claim 14, further comprising:
monitoring a first number of frames or subframes for a first PRS transmission from the serving base station in accordance with the first PRS frequency hopping pattern and a second number of frames or subframes for a second PRS transmission from the serving base station in accordance with the second PRS frequency hopping pattern; and
determining an observed time different of arrival (OTDOA) based at least in part on the first or the second PRS transmission.

16. The method of claim 14, wherein the one or more parameters include information for detecting transmissions of the serving base station and the one or more neighboring base stations based at least in part on the frequency hopping.

17. The method of claim 14, further comprising:

identifying, based at least in part on the one or more parameters, a frequency for one or more uplink positioning transmissions to be transmitted from the UE to each of the serving base station and the one or more neighboring base stations; and transmitting the one or more uplink positioning transmissions to one or more of the serving base station or the one or more neighboring base stations using the identified frequency.

18. The method of claim 17, wherein the transmitting the one or more uplink positioning transmissions is performed in an absence of performance of a listen-before-talk (LBT) procedure.

19. The method of claim 17, further comprising:
determining, based at least in part on the one or more parameters, a transmission time for each of a plurality of uplink positioning transmissions based at least in part on an estimated range between the UE and each of the serving base station and the one or more neighboring base stations; and
transmitting each of the plurality of uplink positioning transmissions based at least in part on the determined transmission time for each of the plurality of uplink positioning transmissions.

20. The method of claim 14, further comprising:
determining one or more frequencies in a dedicated radio frequency spectrum band for PRS transmissions of one or more base stations;
monitoring the one or more frequencies in the dedicated radio frequency spectrum band for the PRS transmissions; and
transmitting measurements associated with the PRS transmissions using the shared radio frequency spectrum band.

21. The method of claim 14, further comprising:
determining, based at least in part on the one or more parameters, a fixed or floating frame alignment for the serving base station and the one or more neighboring base stations; and
monitoring for a PRS transmission from one or more of the serving base station or the one or more neighboring base stations based at least in part on the fixed or floating frame alignment.

22. The method of claim 14, wherein the one or more parameters include one or more of a number of frames or subframes to monitor for a positioning reference signal.

23. The method of claim 14, wherein the one or more parameters include a maximum number of attempts to perform to identify a positioning reference signal from the one or more neighboring base stations.

24. The method of claim 14, further comprising:
transmitting, to the serving base station, one or more measurement reports indicating a first measurement generated in accordance with the first PRS frequency hopping pattern and a second measurement generated in accordance with the second PRS frequency hopping pattern.

25. The method of claim 24, wherein the one or more measurement reports include observed time different of arrival (OTDOA) measurements associated with one or more PRSs from one or more of the serving base station and one or more neighboring base stations.

26. An apparatus for wireless communication at a serving base station, in a system comprising:
a processor;
a transmitter;
memory in electronic communication with the processor; and
instructions stored in the memory and operable, when executed by the processor, to cause the apparatus to:
identify a user equipment (UE) that is using frequency hopping in a shared radio frequency spectrum band for wireless communications;
determine, based at least in part on the frequency hopping, one or more parameters for performing a positioning procedure to determine a position of the UE, wherein the one or more parameters indicate a first positioning reference signal (PRS) frequency hopping pattern for the serving base station and a second PRS frequency hopping pattern for one or more neighboring base stations for the UE to perform PRS transmission detection for the serving base station and for the one or more neighboring base stations; and
transmit, via the transmitter, the one or more parameters to the UE.

27. The apparatus of claim 26, wherein the instructions are operable to cause the processor to:
transmit the one or more parameters that indicate a first number of frames or subframes to monitor for a first PRS transmission from the serving base station in accordance with the first PRS frequency hopping pattern and indicate a second number of frames or subframes to monitor for a second PRS transmission from the serving base station in accordance with the second PRS frequency hopping pattern.

28. The apparatus of claim 26, wherein the one or more parameters include information for the UE to perform transmission detection for the serving base station and the one or more neighboring base stations.

29. An apparatus for wireless communication, in a system comprising:
a processor;
a receiver;
memory in electronic communication with the processor; and
instructions stored in the memory and operable, when executed by the processor, to cause the apparatus to:
receive, at a user equipment (UE) via the receiver, one or more parameters for performing a positioning procedure to determine a position of the UE while operating using frequency hopping in a shared radio frequency spectrum band, wherein the one or more parameters indicate a first positioning reference signal (PRS) frequency hopping pattern for a serving base station and a second PRS frequency hopping pattern for one or more neighboring base stations for the UE to perform PRS transmission detection for the serving base station and for the one or more neighboring base stations; and
perform the positioning procedure, based at least in part on the one or more parameters.

30. The apparatus of claim 29, wherein the instructions are operable to cause the processor to:
monitor a first number of frames or subframes for a first PRS transmission from the serving base station in accordance with the first PRS frequency hopping pattern and a second number of frames or subframes for a second PRS transmission from the serving base station in accordance with the second PRS frequency hopping pattern; and determine an observed time different of arrival (OTDOA) based at least in part on the first or the second PRS transmission.

* * * * *